(12) United States Patent
Robinson et al.

(10) Patent No.: US 11,634,252 B2
(45) Date of Patent: Apr. 25, 2023

(54) MEAL KIT DELIVERY CONTAINER

(71) Applicant: Fresh Prep Foods Inc., Vancouver (CA)

(72) Inventors: Keith Robinson, North Vancouver (CA); Sukhjinder Sidhu, Surrey (CA); Dhruv Sood, Surrey (CA)

(73) Assignee: Fresh Prep Foods Inc., Vancouver (CA)

( * ) Notice: Subject to any disclaimer, the term of this patent is extended or adjusted under 35 U.S.C. 154(b) by 0 days.

(21) Appl. No.: 17/903,445

(22) Filed: Sep. 6, 2022

(65) Prior Publication Data

US 2022/0411131 A1    Dec. 29, 2022
US 2022/0411131 A1    Dec. 29, 2022

Related U.S. Application Data

(63) Continuation of application No. 17/069,748, filed on Oct. 13, 2020, now abandoned.

(60) Provisional application No. 62/914,311, filed on Oct. 11, 2019.

(51) Int. Cl.
| | |
|---|---|
| *B65D 25/04* | (2006.01) |
| *B65D 53/00* | (2006.01) |
| *B65D 1/22* | (2006.01) |
| *B65D 43/02* | (2006.01) |
| *B65D 21/02* | (2006.01) |

(52) U.S. Cl.
CPC .............. *B65D 25/04* (2013.01); *B65D 1/22* (2013.01); *B65D 21/0233* (2013.01); *B65D 43/0212* (2013.01); *B65D 53/00* (2013.01); *B65D 2543/00537* (2013.01); *B65D 2543/00564* (2013.01); *B65D 2543/00574* (2013.01); *B65D 2543/00953* (2013.01)

(58) Field of Classification Search
CPC .... B65D 25/04; B65D 25/06; B65D 43/0212; B65D 21/0233; B65D 1/24
USPC ............................. 220/23.83, 23.88; 206/514
See application file for complete search history.

(56) References Cited

U.S. PATENT DOCUMENTS

| | | | | |
|---|---|---|---|---|
| 2,614,399 | A | * | 10/1952 | Roethel ..................... F25C 1/24 220/23.88 |
| 2,787,891 | A | * | 4/1957 | Hengehold ............. A47J 39/02 62/530 |
| 3,241,706 | A | * | 3/1966 | Monaco .................. A47J 27/10 220/23.88 |
| 5,366,069 | A | * | 11/1994 | Seidner .................... A45C 1/10 206/499 |

(Continued)

*Primary Examiner* — Jeffrey R Allen
(74) *Attorney, Agent, or Firm* — Roni M. Jones; Oyen Wiggs Green & Mutala LLP

(57) ABSTRACT

A container for delivering ingredients of a meal kit to a consumer. The container comprises a main container and one or more cups removably locatable within the main container. The one or more cups may vary in size and shape. Various combinations of cups of different sizes and shapes can be located in the main container. In spite of the various sizes and shapes of cups that may be located in the main container, a lid may be provided that seals the main container and each of the one or more cups that are located within the main container for different selections and arrangements of the cups. In some embodiments, each of the one or more cups is supported above a base surface of the main container to create a space between the one or more cups and the base surface of the main container.

20 Claims, 19 Drawing Sheets

(56) References Cited

U.S. PATENT DOCUMENTS

| | | | | |
|---|---|---|---|---|
| 5,417,338 A | * | 5/1995 | Roy | B65F 1/1646 |
| | | | | 220/543 |
| 2004/0129707 A1 | * | 7/2004 | Weir | A47J 47/10 |
| | | | | 220/500 |
| 2009/0145797 A1 | * | 6/2009 | Steinmeyer | B65D 21/0233 |
| | | | | 206/505 |
| 2012/0318792 A1 | * | 12/2012 | Larson | B25H 3/02 |
| | | | | 220/23.88 |
| 2013/0024468 A1 | * | 1/2013 | Kocsis | B65D 53/00 |
| | | | | 220/23.88 |
| 2017/0029169 A1 | * | 2/2017 | Shamp | B65D 21/0233 |
| 2019/0375551 A1 | * | 12/2019 | Bell | B65D 25/06 |

\* cited by examiner

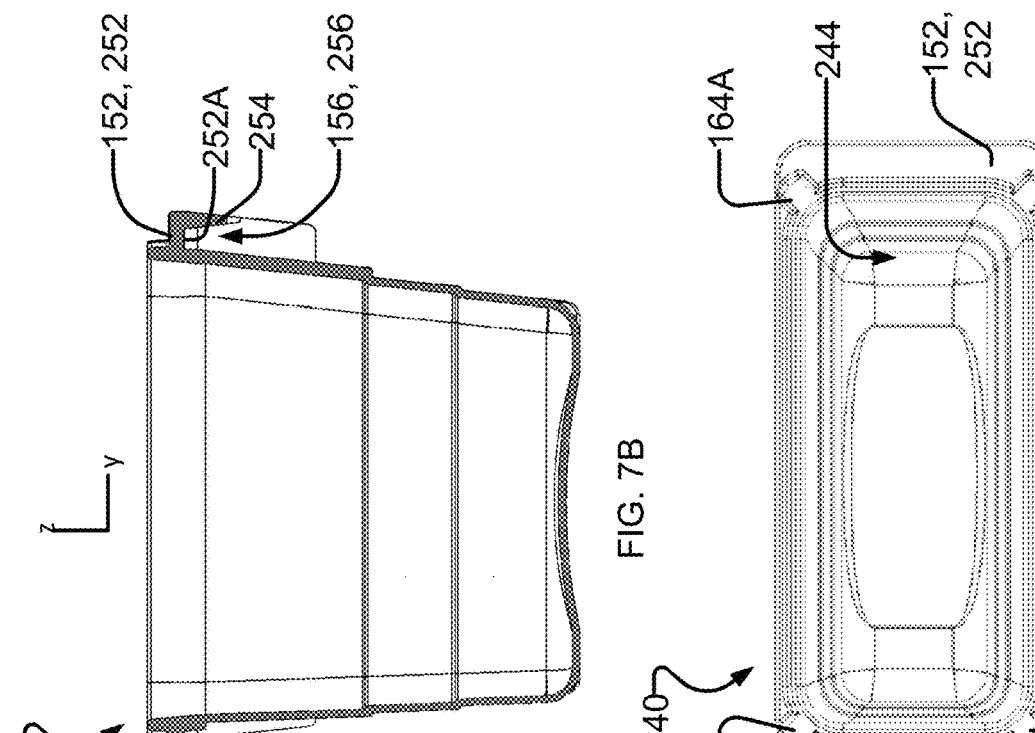
FIG. 7B
FIG. 7C
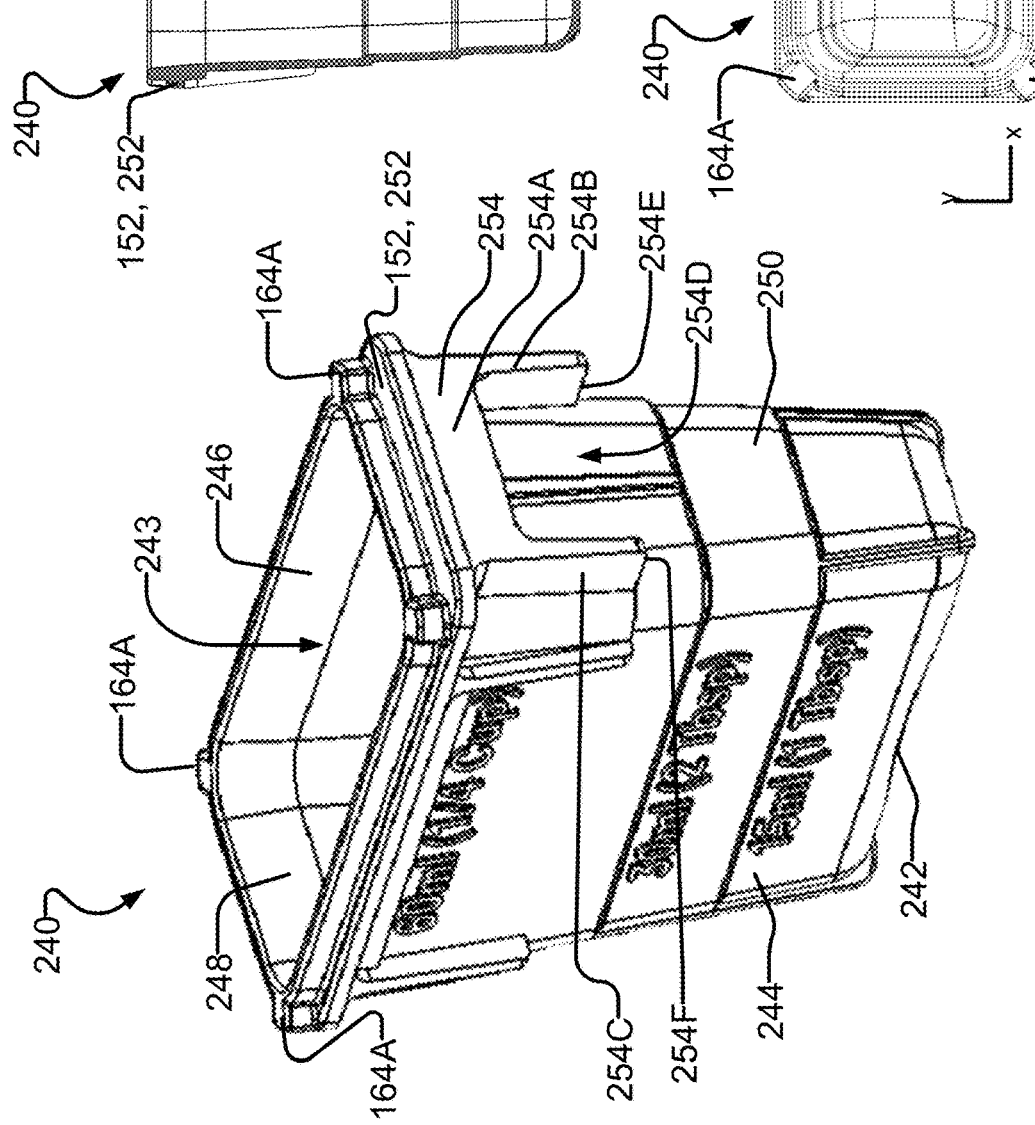
FIG. 7A

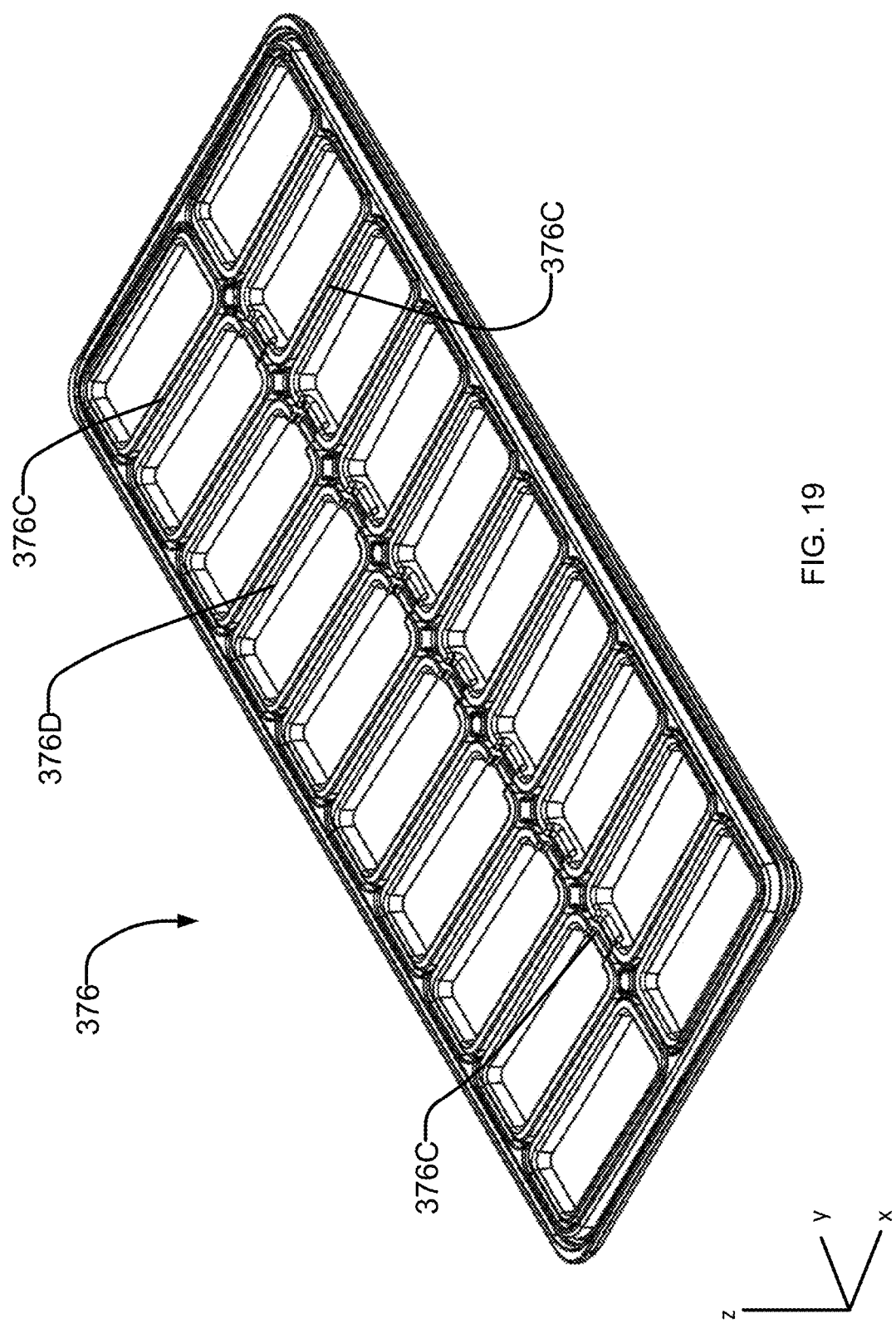

MEAL KIT DELIVERY CONTAINER

RELATED APPLICATIONS

This application is a continuation of U.S. application. Ser. No. 17/069,748 having a filing date of 13 Oct. 2020, which in turn claims priority from, and for the purposes of the United States the benefit of 35 USC § 119 in respect of, U.S. application No. 62/914,311 filed 11 Oct. 2019. All of the applications in this paragraph are hereby incorporated herein by reference.

TECHNICAL FIELD

This invention relates to containers for storing and transporting food. Particular embodiments provide containers for meal kit delivery services.

BACKGROUND

Meal kit delivery services deliver ingredients and corresponding recipes directly to consumers. Such ingredients may be pre-measured, pre-cut and/or pre-washed to save consumers' time and encourage consumers to cook. Consumers of meal kit delivery services do not need to purchase ingredients from a grocery store, do not need to worry about having too much or too little of any one ingredient and are encouraged to try new recipes.

Typically, each ingredient in a meal kit is individually packaged to ensure freshness. Often, such packaging is not recyclable or reusable. Even if such packaging is recyclable, it may not be properly recycled by consumers for various reasons. As such, many meal kits lead to undesirable waste and may be harmful for the environment.

There have been various attempts to employ reusable packaging for meal and meal kit delivery services. However, such packaging does not easily accommodate the variations in packaging needs (e.g. size, shape and number of ingredients) of the many different recipes that meal kit delivery services provide. Further, such packaging does not provide a sufficient seal for liquid ingredients.

There is a general desire for a compact, re-usable (and/or recyclable) meal kit delivery container that is configurable for many different recipes. There is a general desire for a compact, re-usable (and/or recyclable) meal kit delivery container that is configurable for ingredients of different shapes, sizes and consistencies (e.g. liquids and solids).

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a meal kit delivery container. The meal kit delivery container may comprise a main container comprising a base, first and second opposing sidewalls extending from the base and first and second opposing endwalls extending from the base, each of the first and second opposing endwalls extending from the first sidewall to the second sidewall to define a cavity. One or more cups may each cup removably supportable inside the cavity by at least one of a plurality of support features of the main container at a location wherein when supported inside the cavity such that a base of each cup is spaced apart from the base of the main container and a topmost opening-defining edge of each of the one or more cups is coplanar with each of the others of the one or more cups support inside the cavity.

In some embodiments, the plurality support features comprise one or more first support features protruding from the first sidewall. In some embodiments, the plurality of support features comprise one or more first support features protruding from the first sidewall and one or more second support features protruding from the second sidewall. In some embodiments, the one or more first support features protrude from a first shoulder of the first sidewall and the one or more second support features protrude from a second shoulder of the second sidewall. In some embodiments, an upper portion of the first sidewall extends from the first shoulder and an upper portion of the second sidewall extending from the second shoulder.

In some embodiments, a height of the upper portion of the first sidewall as measured from the first shoulder is greater than a height of each of the one or more first support features as measured from the first shoulder. In some embodiments a height of the upper portion of the second sidewall as measured from the second shoulder is greater than a height of each of the one or more second support features as measured from the second shoulder.

In some embodiments, each of the one or more first support features comprises a first reinforcement between the first support feature and the upper portion of the first sidewall and each of the one or more second support features comprises a second reinforcement between the second support feature and the upper portion of the second sidewall.

In some embodiments, an inner surface of each of the one or more first support features is substantially co-planar with an inner surface of the first sidewall and an inner surface of each of the one or more second support features is substantially co-planar with an inner surface of the second sidewall.

In some embodiments, each of the plurality of support features taper in width as the one or more tabs extend away from the base of the main container. In some embodiments, each of the plurality of support features taper in depth as the one or more tabs extend away from the base of the main container.

In some embodiments, a first cup of the one or more cups comprises a first lip and a first hook together defining a first recess for receiving the at least one of the plurality of support features. In some embodiments, the first cup is supported by one of the first support features and is spaced apart from each other first support feature. In some embodiments, the first cup is supported by two of the first support features and is spaced apart from each other first support feature. In some embodiments, the first cup is also supported by a portion of an inner surface of the first sidewall. In some embodiments, the first cup is supported by one or more of the first support features and the first cup is spaced apart from the second sidewall.

In some embodiments, the first cup comprises a second lip and a second hook together defining a second recess for receiving one or more of the second support features. In some embodiments, the first cup is supported by one of the second support features and is spaced apart from each other second support feature. In some embodiments, the first cup is supported by two of the second support features and is spaced apart from each of other second support features. In some embodiments, the first cup is also supported by a portion of an inner surface of the second sidewall.

In some embodiments, a second cup of the one or more cups comprises a third lip and a third hook together defining a third recess for receiving one or more of the second support features. In some embodiments, the second cup is supported by one of the second support features and is spaced apart from each other second support feature. In some embodiments, the second cup is supported by two of the second support features and is spaced apart from each other second support feature. In some embodiments, the second cup is also supported by a portion of an inner surface of the second sidewall. In some embodiments, when the second cup is supported by one or more of the second support features, the second cup is spaced apart from the first sidewall. In some embodiments, the first cup is supported opposite the second cup.

In some embodiments, each of the one or more cups has a length of na wherein n is an integer and each cup is supported by a number, i, of support features on first sidewall and i is equal to n. In some embodiments, n is equal to one for at least one cup. In some embodiments, n is equal to two for at least one cup. In some embodiments, n is equal to three for at least one cup.

In some embodiments, the meal kit delivery container comprises a lid and the lid comprises a gasket for sealing each of the one or more cups. In some embodiments, the gasket is removable. In some embodiments, the gasket comprises a plurality of inner gasket walls. In some embodiments, the gasket comprises a plurality of outer gasket walls. In some embodiments, each of edge of each cup is sandwiched at least in part between the inner gasket wall and the outer gasket wall.

In some embodiments, each of the one or more cups has a length of na wherein n is an integer and wherein the gasket comprises gaps between adjacent outer gasket walls and wherein an edge of a cup having n≥2 passes through one or more of the gaps. In some embodiments, each of the one or more cups has a width of mb wherein m is an integer and wherein the gasket comprises gaps between adjacent outer gasket walls and wherein an edge of a cup having m≥2 passes through one or more of the gaps.

In some embodiments, an edge of each cup comprises four or more protrusions complementary in shape to the gaps between the outer gasket walls. In some embodiments, the lip of each cup comprises four corners and one of the four or more protrusions protrudes from each of the four corners.

In some embodiments, at least two cups of the one or more cups have different heights and bases of the at least two cups are spaced apart from the base of the main container by different distances.

In some embodiments, the gasket is beveled. In some embodiments, the gasket is deformed by between 2 mm and 4 mm by contact with the one or more cups when the lid is installed on the main container. In some embodiments, a contact surface of the gasket is smooth. In some embodiments, a contact surface of the gasket is flat.

In some embodiments, an interior surface of the gasket defines one or more channels. In some embodiments, the one or more channels isolate deformation of the gasket due to interaction of the gasket with one of the one or more cups from deformation of the gasket due to interaction of the gasket with another one of the one or more cups.

In some embodiments, the gasket is integral to the lid. In some embodiments, the gasket sandwiched between the main container and the lid.

In some embodiments, attaching the lid to the main container causes deformation of the gasket. In some embodiments, the deformation of the gasket is caused by interaction of the main container with the gasket and the gasket applies restorative deformation forces against the main container. In some embodiments, the deformation of the gasket is caused by interaction of the one or more cups with the gasket and the gasket applies restorative deformation forces of the gasket against the one or more cups.

In some embodiments, the lid is attachable to the main container by a plurality of snaps.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 7A is an isometric view of a cup of a meal kit delivery container according to one exemplary embodiment of the invention. FIG. 7B is a front view of a yz-plane cross-section of the cup of FIG. 7A. FIG. 7C is a top view of the cup of FIG. 7A.

FIG. 19 is an isometric bottom view of the gasket of FIG. 18.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One aspect of the invention provides a container for storing food. This container may be employed for delivering ingredients of a meal kit to a consumer. In some embodiments, the container comprises a main container and one or more cups removably locatable within the main container. In some embodiments, the one or more cups vary in size and shape. In some embodiments, various combinations of cups of different sizes and shapes can be located in the main container. In spite of the many possible combinations of sizes and shapes of cups that may be located in the main container, a single lid may seal the main container and each of the one or more cups that are located within the main container for different selections and arrangements of the cups. In some embodiments, each of the one or more cups is supported above a base surface of the main container to create a space between the one or more cups and the base surface of the main container. Longer food items such as, but not limited to, raw spaghetti noodles, celery, carrots and the like can be stored in the space between the base surface of the main container and the cups located in the main container.

Figure 1:
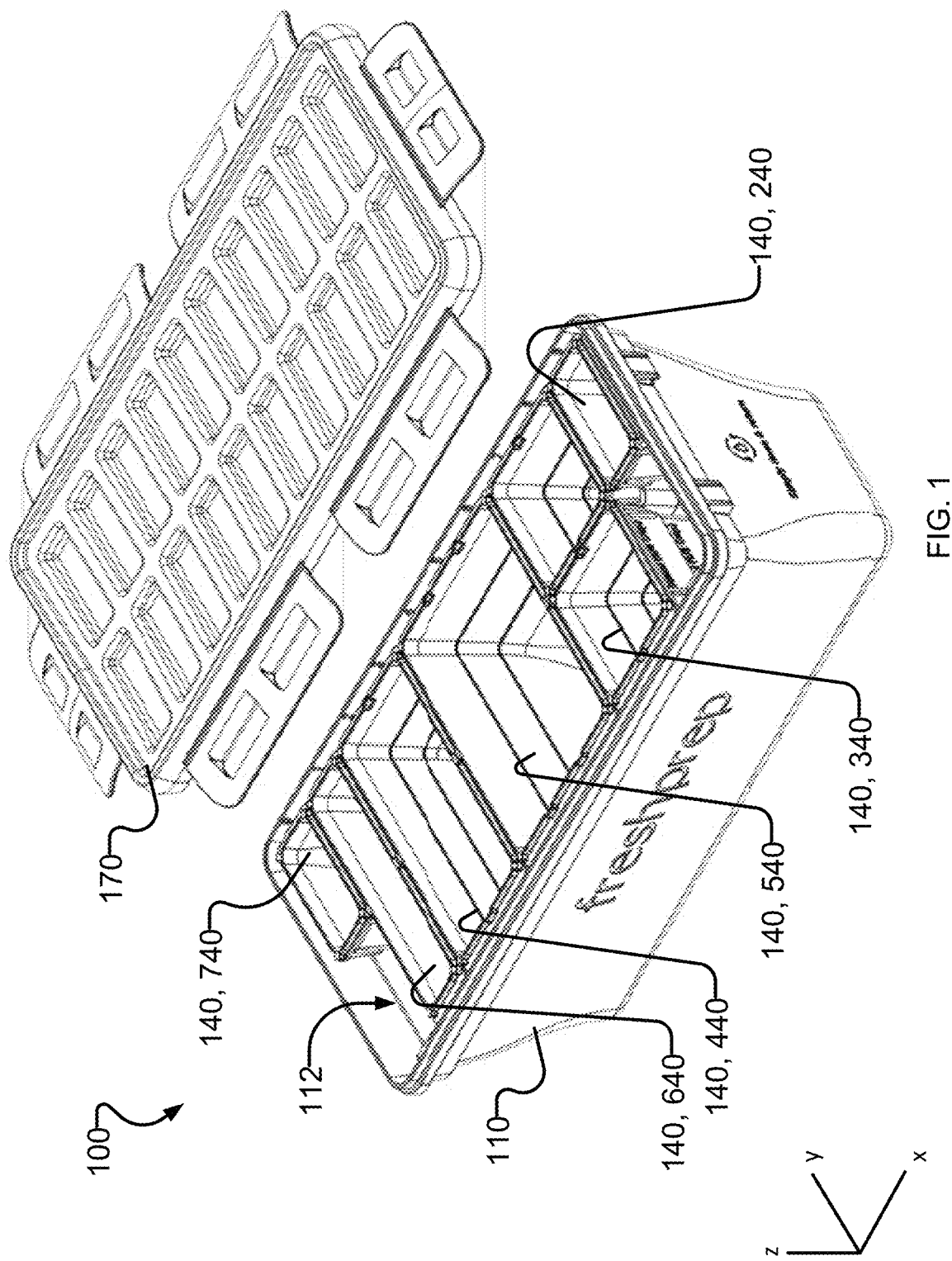
FIG. 1 is an isometric view of a meal kit delivery container according to one exemplary embodiment of the invention.

FIG. 1 depicts a meal kit delivery container 100 according to one non-limiting exemplary embodiment of the invention. Container 100 comprises a main container 110, one or more cups 140 removably locatable (e.g. supportable) within a cavity 112 of main container 110 and a lid 170. Lid 170 may seal main container 110 and/or each individual cup 140 located in main container 110.

As shown in FIG. 1, meal delivery container 100 comprises a plurality of cups 140. For example, in the illustrated embodiment, meal delivery container 100 comprises cups of different sizes and/or shape (e.g. cups 240, 340, 440, 540, 640, 740) that may collectively or generically be referred to as cups 140. Cups 140 may comprise lips (e.g. lips 252, 352, etc.) that may be generically or collectively referred to herein as lips 152, cavities (e.g. cavities 243, 343) that may be generically or collectively referred to herein as cavities 143, bases (e.g. bases 242, 342) that may be generically or collectively referred to herein as bases 142 and recesses (e.g. recesses 256, 356, 360, etc.) that may be generically or collectively referred to herein as recesses 156 as shown in FIGS. 7A, 7B and 7C.

Figure 2:
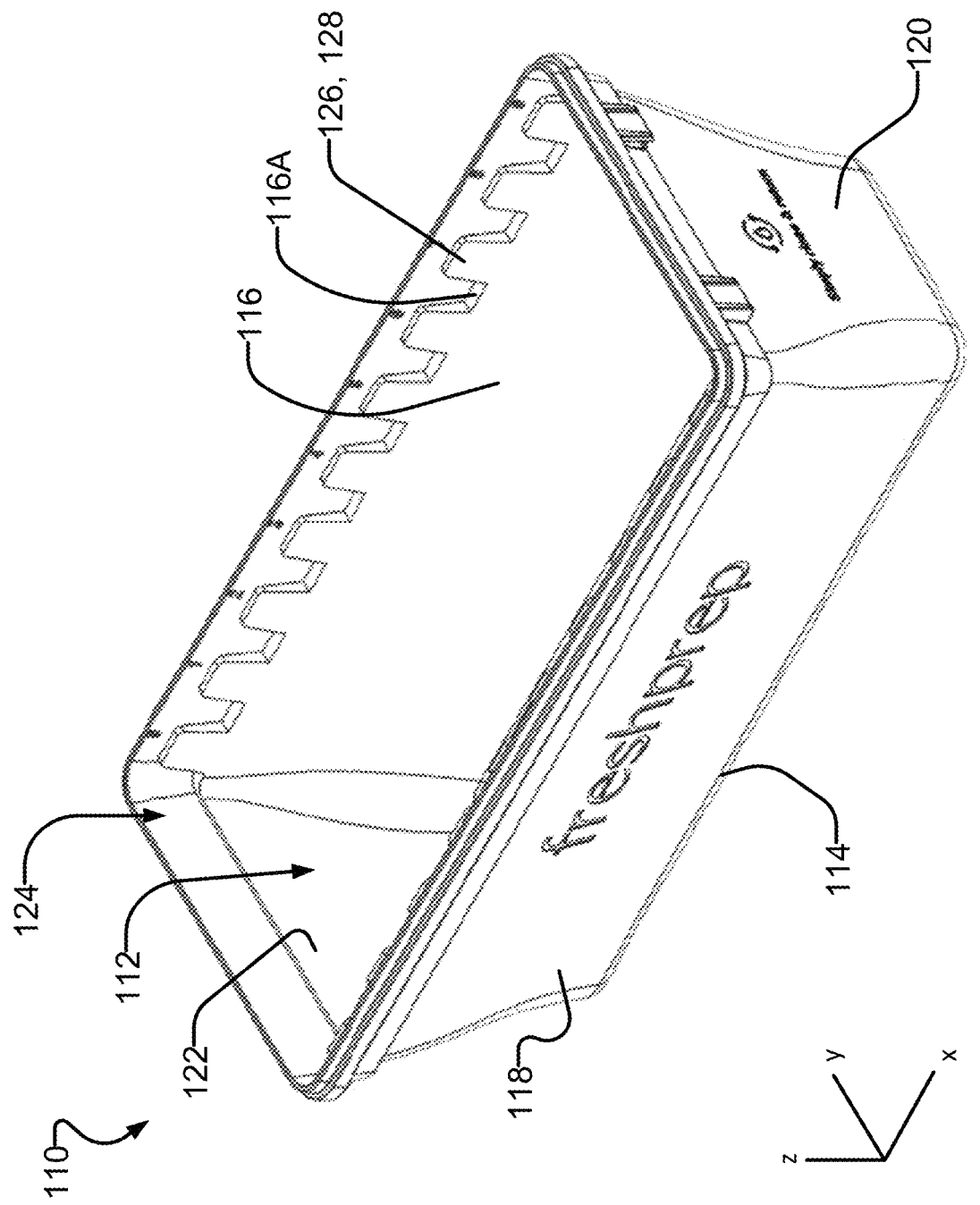
FIG. 2 is an isometric view of a main container of a meal kit delivery container according to one exemplary embodiment of the invention.

FIG. 2 depicts a main container 110 according to one non-limiting example embodiment. Main container 110 comprises a base 114, a first sidewall 116 extending in the z-direction from base 114, a second sidewall 118 extending in the z-direction from base 114 opposite first sidewall 116 and first and second opposing endwalls 120, 122 extending in the z-direction from base 114 and at least partially in the y-direction between first and second opposing sidewalls 116, 118. Together, base 114, first and second sidewalls 116, 118 and first and second endwalls 120, 122 define cavity 112. Cavity 112 is accessible through opening 124.

In some embodiments, first sidewall 116 comprises a shoulder 116A extending at least partially outwardly in the y-direction from a lower portion 116B of first sidewall 116 and an upper portion 116C of first sidewall 116 extending in the z-direction from shoulder 116A. This is not mandatory. Similarly, in some embodiments, second sidewall 118 comprises a shoulder 118A extending outwardly at least partially in the y-direction from a lower portion 118B of second sidewall 118 and an upper portion 118C of second sidewall 118 extending in the z-direction from shoulder 118A. This is also not mandatory.

Figure 6A:
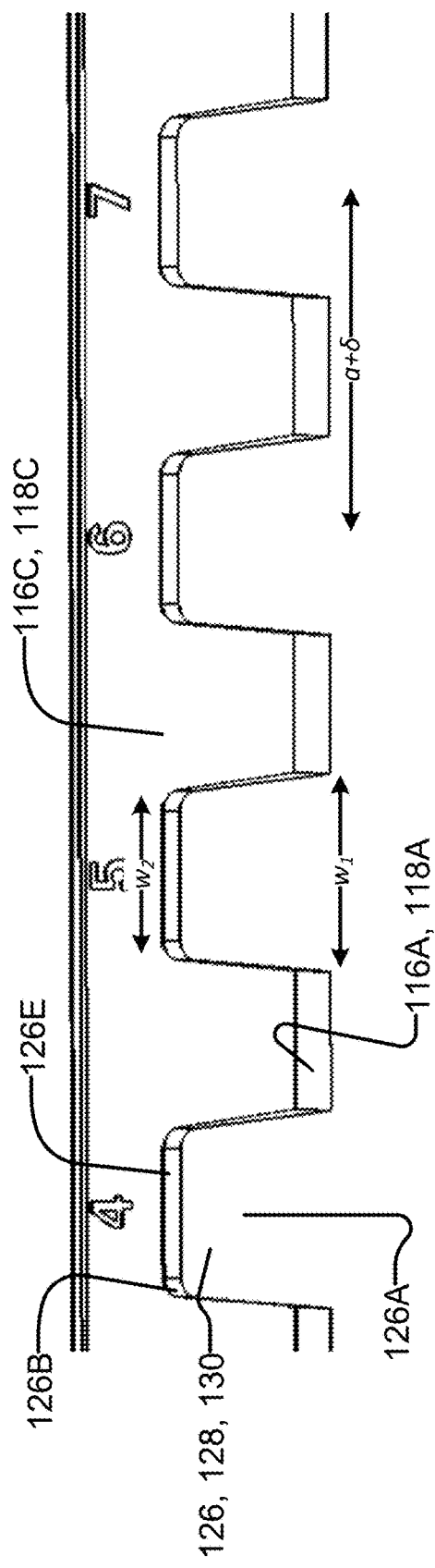
FIG. 6A is an isometric view of a portion of the main container of FIG. 2.
Figure 6B:
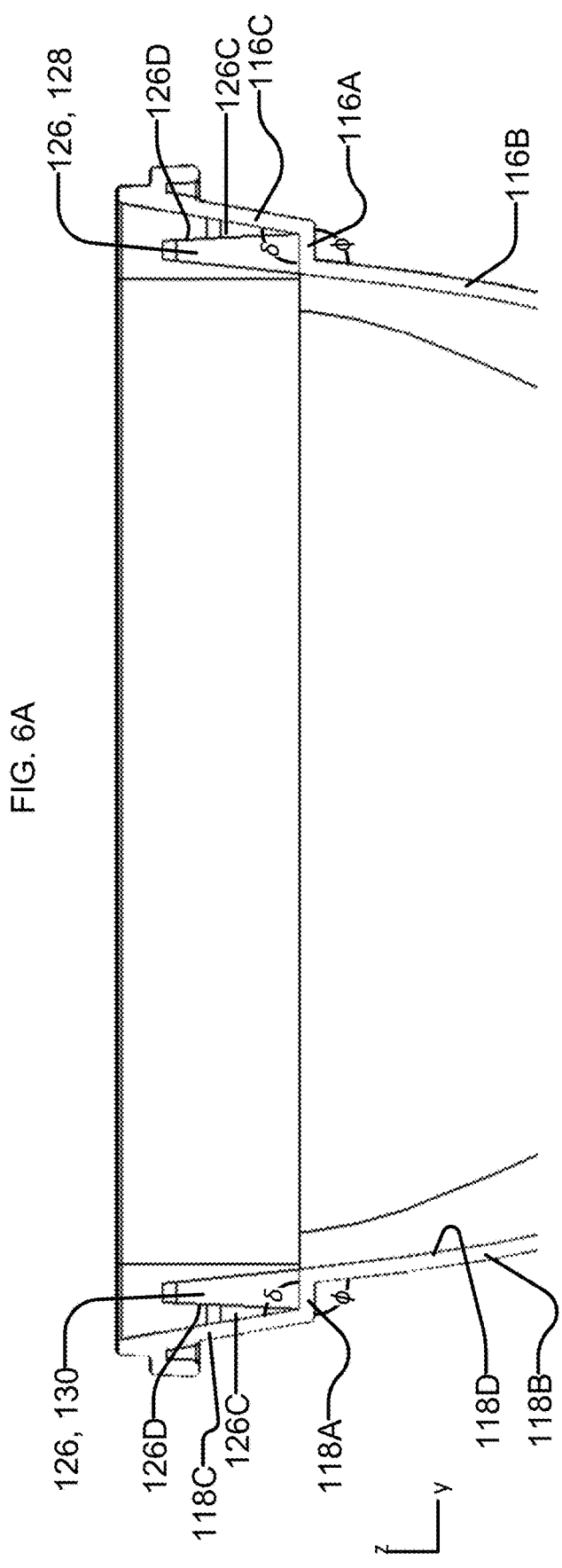
FIG. 6B is a front view of a yz-plane cross-section of the main container of FIG. 2.

As can be seen in FIG. 6B, shoulders 116A, 118A form a step that may extend outwardly from lower portions 116B, 118B of first and second sidewalls 116, 118 respectively at angles, $\phi$, where angles, $\phi$, are between 90° and 110°. In some embodiments, angles, $\phi$, are between 95° and 105°. First and second upper portions 116C, 118C of sidewalls 116, 118 may extend at angles, $\delta$, from first and second shoulders 116A, 118A respectively. In some embodiments angles, $\delta$, are between 85° and 95°. In some embodiments angles, $\delta$, are between 88° and 92°. In some embodiments angles, $\delta$, are 90°.

In some embodiments, main container 110 is tapered (e.g. main container 110 may comprise a truncated rectangular pyramid shape) to allow multiple main containers 110 to be stacked. For example, as can be seen from FIG. 8, first and second sidewalls 116, 118 extend outwardly in the y-direction as they extend in the z-direction away from base 114. Similarly, as can be seen from FIG. 3, first and second endwalls 120, 122 extend outwardly in the x-direction as they extend in the z-direction away from base 114.

Cups 140 may be inserted into cavity 112 of main container 110 through opening 124. In some embodiments, cups 140 are supported on base 114 of container 110. This is not mandatory. In some embodiments, cups 140 are supported at locations spaced apart from base 114 of main container 110.

Figure 3:
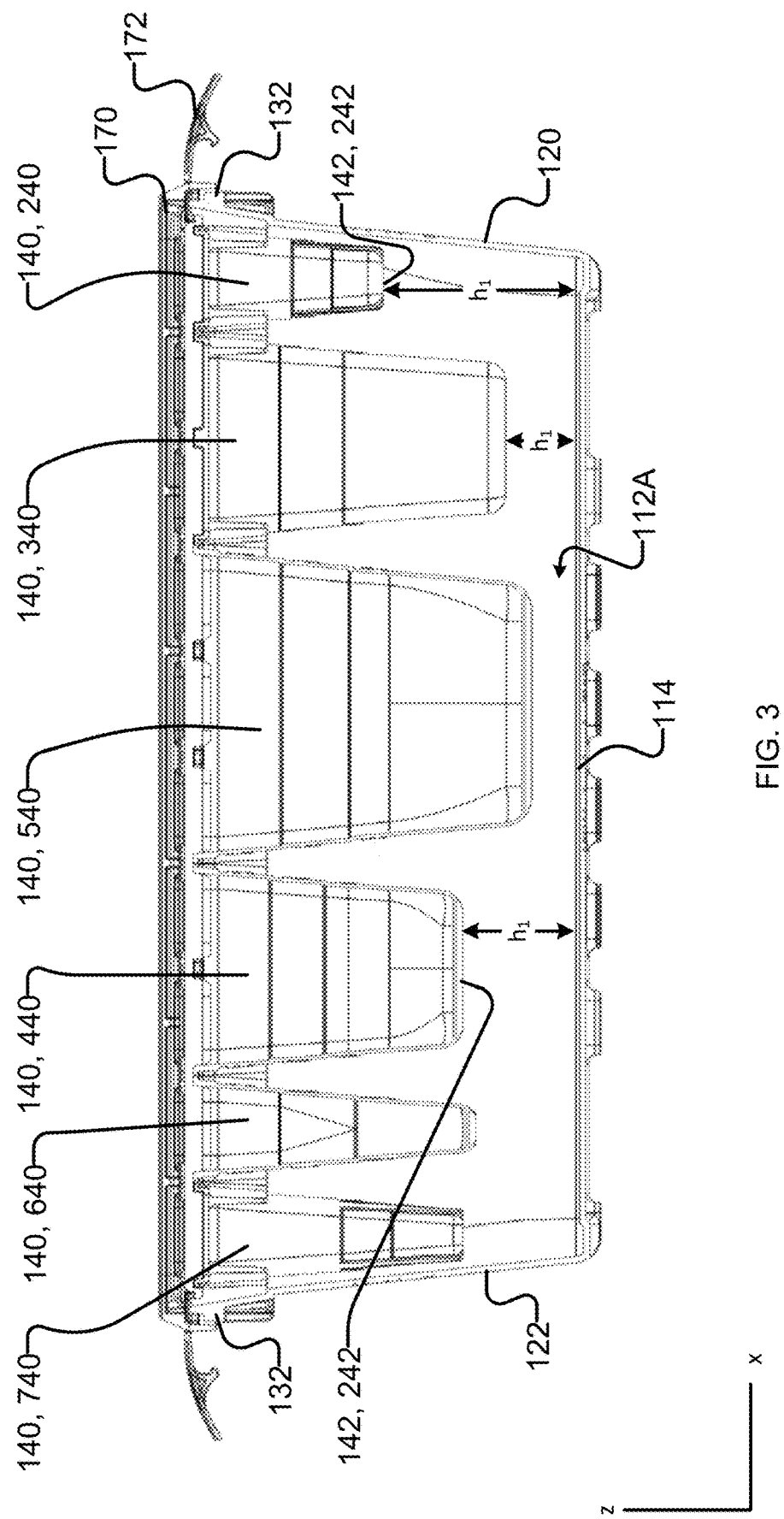
FIG. 3 is a side view of an xz-plane (e.g. a plane extending in the x-direction and the z-direction) cross-section of a meal kit delivery container according to one exemplary embodiment of the invention.

Main container 110 may comprise one or more support features 126 for supporting one or more cups 140 inside cavity 112. In some embodiments, support features 126 support each of the one or more cups 140 within cavity 112 at a location wherein a base 142 of each cup 140 is spaced apart in the z-direction from base 114 of main container 110 by a height, $h_1$, as shown in FIG. 3. The portion 112A of cavity 112 between base 114 of main container 110 and bases 142 of cups 140 may be used to store longer items such as, but not limited to, spaghetti, celery, carrots or the like since portion 112A may extend up to the entire distance in the x-direction from first endwall 120 to second endwall 122.

In some embodiments, support features 126 are arranged to support cups 140 such that a lip 152 of each cup 140 supported within cavity 112 is coplanar (in an xy-plane). Lips 152 of each cup 140 supported within cavity 112 may be coplanar (in an xy-plane) despite height, $h_1$, being different for one or more cups 140, as shown in FIG. 3. This may facilitate having a single lid 170 seal each cup 140 located in cavity 112 of main container 110 despite cups 140 being of different sizes and shapes. For example, despite cup 240 having a different length in the x-direction than cup 340, lips 152 of each of cup 240 and 340 are coplanar (in an xy-plane). Similarly, despite cups 240 and 740 having different heights in the z-direction, lips 152 of each of cup 240 and 740 are coplanar (in an xy-plane).

In some embodiments, support features 126 comprise first support features 128 protruding from first sidewall 116. In some embodiments, support features 126 comprise a linear array of first support features 128 protruding from first sidewall 116. In some embodiments, support features 126 additionally or alternatively comprise second support features 130 protruding from second sidewall 118. In some embodiments, support features 126 comprise a linear array of second support features 130 protruding from second sidewall 118. First support features 128 and second support features 130 (collectively or generically referred to as support features 126) may comprise tabs, hooks, recesses, loops or the like that mate with corresponding (e.g. complementary) features of cups 140.

In some embodiments, support features 126 project in the z-direction. In some embodiments, first support features 128 protrude in the z-direction from first shoulder 116A of first sidewall 116. Similarly, in some embodiments, second support features 130 protrude in the z-direction from second shoulder 118A of second sidewall 118. This is not mandatory. Support features 126 could protrude from any portion of first and second sidewalls 116, 118. In some embodiments, first and second upper portions 116C, 118C of sidewalls 116, 118 extend from first and second shoulders 116A, 118A in the y-direction more than first and second support features 128, 130 extend from first and second shoulders 116A, 118A in the y-direction such that first and second support features 128, 130 are located within cavity 112 of main container 110.

As can be seen from FIGS. 6A and 6B, support features 126 may protrude from shoulder 116A (or shoulder 118A as the case may be) such that a first surface 126A of support feature 126 extends parallel or coplanar with at least a portion of the inner surface 116D of lower portion 116B of first sidewall 116 (or inner surface 118B of the lower portion 118B of second sidewall 118 as the case may be). This may facilitate installation of cups 140 by allowing support features 126 to slide into recesses 156 of cups without interruption.

In some embodiments, a width, $w_1$, of each support feature 126 at a point closest to shoulder 116A (or shoulder 118A) may be greater than a width, $w_2$, of each support feature 126 at a point distal to shoulder 116A (or shoulder 118A) such that the width of support feature 126 is tapered. Similarly, a depth, $d_1$, of each support feature 126 at a point closest to shoulder 116A (or shoulder 118A) may be greater than a depth, $d_2$, of each support feature 126 at a point distal to shoulder 116A (or shoulder 118A) such that the depth of each support feature 126 is tapered. Such a tapered width and/or tapered depth of support features 126 may facilitate alignment of cups 140 with support features 126 while mounting cups 140 on support features 126. Such a tapered width and/or tapered depth of support feature 126 may create a friction fit, wedge fit or the like between recesses 156 of cups 140 and support features 126 to thereby reduce undesirable relative movement (in or about the x, y or z-directions) between support features 126 and cups 140 when cups 140 are supported by support features 126.

In some embodiments, corners 126B of support features 126 are rounded. Rounded corners 126B may facilitate alignment of cups 140 with support features 126 while mounting cups 140 on support features 126.

In some embodiments, support features 126 comprise reinforcements 126C connecting a second surface 126D of first support features 126 to upper portion 116C of first sidewall 116 (or upper portion 118C of second sidewall 118 as the case may be). Reinforcements 126C may strengthen support features 126 and may provide additional surfaces against which recesses 156 of cups 140 may abut or wedge to thereby reduce undesirable relative movement (in the x, y and/or z-directions) between cups 140 and support features 126 when cups 140 are supported by support features 126.

The number, arrangement, shape and size of cups 140 supported by support features 126 within main container 110 may be varied as desired. For example, different sizes, shapes, arrangements and numbers of cups 140 may be chosen based on the recipe of the meal being delivered in meal kit delivery container 100.

Figure 4:
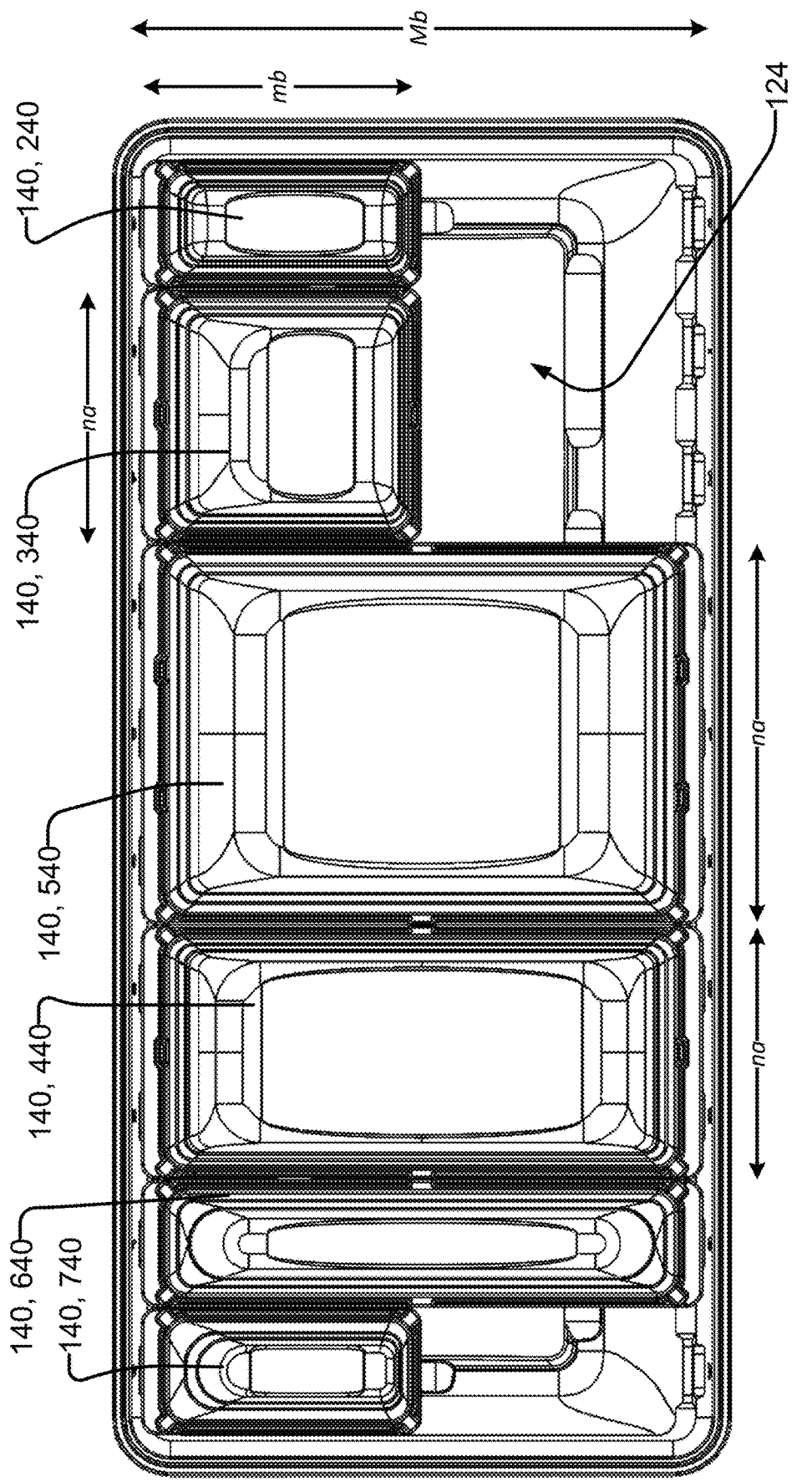
FIG. 4 is a top view of a of a meal kit delivery container without a lid according to one exemplary embodiment of the invention.
Figure 5:
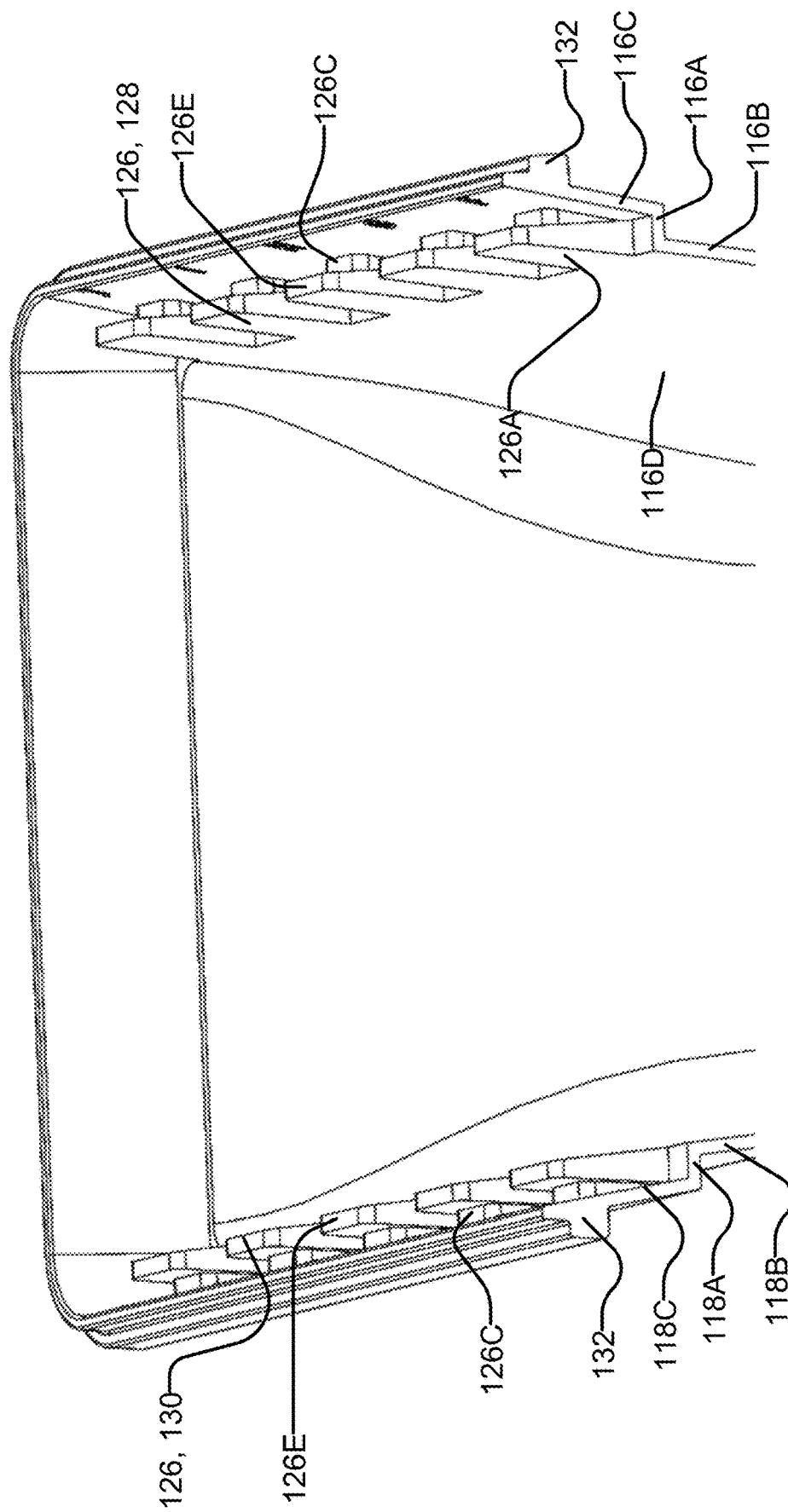
FIG. 5 is an isometric view of a yz-plane (e.g. a plane extending in the y-direction and the z-direction) cross-section of a portion of the main container of FIG. 2.

FIG. 4 shows an exemplary non-limiting combination of an exemplary number of cups 140 of different sizes and shapes. Cups 140 may have an x-direction dimension that is a multiple of a first unit dimension and a y-direction dimension that is a multiple of a second unit dimension. For example, referring to FIG. 4, each cup 140 may have an x-direction dimension that is a multiple, n, of a unit dimension, a, and a y-direction dimension that is a multiple, m, of a unit dimension, b. For example:

for cup 240 n=1 and m=1;
for cup 340 n=2 and m=1;
for cup 440 n=3 and m=2;
for cup 540 n=1 and m=2;
for cup 640, n=1 and m=1; and
for cup 740, n=1 and m=1.

While the depicted embodiments only shows cups 140 of the above-noted dimensions, it should be understood that cups 140 having other combinations of n and m could be employed and other combinations and variations of cups 140 having various sizes and shapes could be fitted in main container 110.

To allow for each cup 140 to fit within main container 110, opening 124 of main container 110 may have a minimum x-direction dimension of at least Na where N is the larger of the sum of the multiples, n, of each cup 140 supported by first sidewall 116 and the sum of the of the multiples, n, of each cup 140 supported by second sidewall 118. For example, in the FIG. 4 embodiment, the sum of the multiples, n, of each cup 140 supported by first sidewall 116 is ten and the sum of the multiples, n, of each cup 140 supported by second sidewall 118 is six. Therefore, for the FIG. 4 embodiment, N is equal to ten. While in the depicted embodiment, N=10, this is not necessary and N could equal any desirable integer.

To allow for each cup 140 to fit within main container 110, opening 124 of main container 110 may have a minimum y-direction dimension of at least Mb where M is the largest of the sums of the multiples, m, of each cup 140 that overlaps in the y-direction within main container 110, where two or more cups overlap in the y-direction if a single y-direction line can be drawn to intersect all of the two or more overlapping cups. Therefore, in the FIG. 4 embodiment, since no cups overlap in the y-direction and the largest value of m is two, M is equal to two.

Where M is equal to two, it may be possible to install a first cup 140 having m=1 mounted on a first support feature 128 opposite a second cup 140 having m=1 mounted on second support feature 130 such that first and second cups 140 overlap in the y-direction. For example, FIG. 1 depicts a pair of cups 340 mounted opposite one another such that they overlap in the y-direction. In this way, it is possible to increase the number of cups 140. Further, it may be desirable to provide small cups that are not overly narrow (in the x-direction) to facilitate filling of cavities 143. This may be particularly advantageous where there are a large number of ingredients in a recipe but the amounts of such ingredients are small enough to fit in relatively smaller cups like cups 240, 340, 740.

It should also be understood that M could equal one. It should also be understood that M could equal more than two. For example, if M equals three, it would be possible to provide a first cup 140 having m=1 opposite and overlapping in the y-direction with a second cup 140 having m=1 or m=2. It would also be possible to have a cup having m=3.

To allow for each cup 140 to fit beside adjacent cups 140, x-direction midpoints of adjacent support features 126 may be spaced apart by a minimum x-direction dimension of a+δ, where δ is a clearance factor to ease installation of cups 140. In some embodiments, δ is between 0.02a and 0.04a. In some embodiments, δ is between 0.5 mm and 3 mm.

In some embodiments, the number of first support features 128 and the number of second support features 130 are each equal to N, where N is the larger of the sum of the multiples, n, of each cup 140 supported by first sidewall 116 and the sum of the of the multiples, n, of each cup 140 supported by second sidewall 118.

Conversely, the sum of the multiples, n, of each of the maximum number of cups 140 supportable by first sidewall 116 is N*, where N* is the number of first support features 128 and the sum of the multiples, n, of each of the maximum number of cups 140 supportable by second sidewall 118 is N*, where N* is the number of second support features 130. In some embodiments, N*=N. This is not mandatory.

FIGS. 7A to 7C depict an exemplary cup 240. Cup 240 comprises a base 242, a first sidewall 244 extending in the z-direction from base 114, a second sidewall 246 extending at least in the z-direction from base 242 opposite first sidewall 244 and first and second opposing endwalls 248, 250 extending in the z-direction from base 242 and at least partially in the x direction between first and second opposing sidewalls 244, 246. Together, base 242, first and second sidewalls 244, 246 and first and second endwalls 248, 250 define cavity 243.

In some embodiments, cup 240 is tapered to allow cups 240 to be stacked within each other (or other cups 140) and/or to fit within the tapered shape of main container 110. For example, as can be seen from FIGS. 7A and 7B, first and second sidewalls 244, 246 extend outwardly in the x-direction as they extend in the z-direction away from base 242 and first and second endwalls 248, 250 extend outwardly in the y-direction as they extend in the z-direction from base 242.

Cup 240 may comprise a lip 252 that extends outwardly (e.g. at least partially in the x or y-directions) around at least a portion of the perimeter of the opening of cup 240. For example, lip 252 may extend outwardly from a top edge (e.g. an edge distal to base 242) of first and second sidewalls 244, 246 and/or a top edge (e.g. an edge distal to base 242) of first and second endwalls 248, 250. As shown in FIG. 7A, lip 252 may be continuous around the perimeter of the opening of cup 240. This is not mandatory.

A hook 254 may protrude from lip 252. Hook 254 may comprise a hook endwall 254A and opposing hook sidewalls 254B, 254C. Hook endwall 254A, opposing hook sidewalls 254B, 254C and endwall 250 may together define a recess 256 for receiving one or more support features 126.

Recess 256 may be complementary in shape to support features 126. In particular, recess 256 may be tapered in length and depth similar to support features 126. Hook endwall 254A may define a cutout 254D. Cutout 254D may be complementary in shape to reinforcement 126C such that reinforcement 126C does not interfere with insertion of support features 126 into recess 256. Moreover, the complementary shapes of cutout 254D and reinforcement 126C may reduce unwanted movement between cup 240 and container 110.

Figure 8:
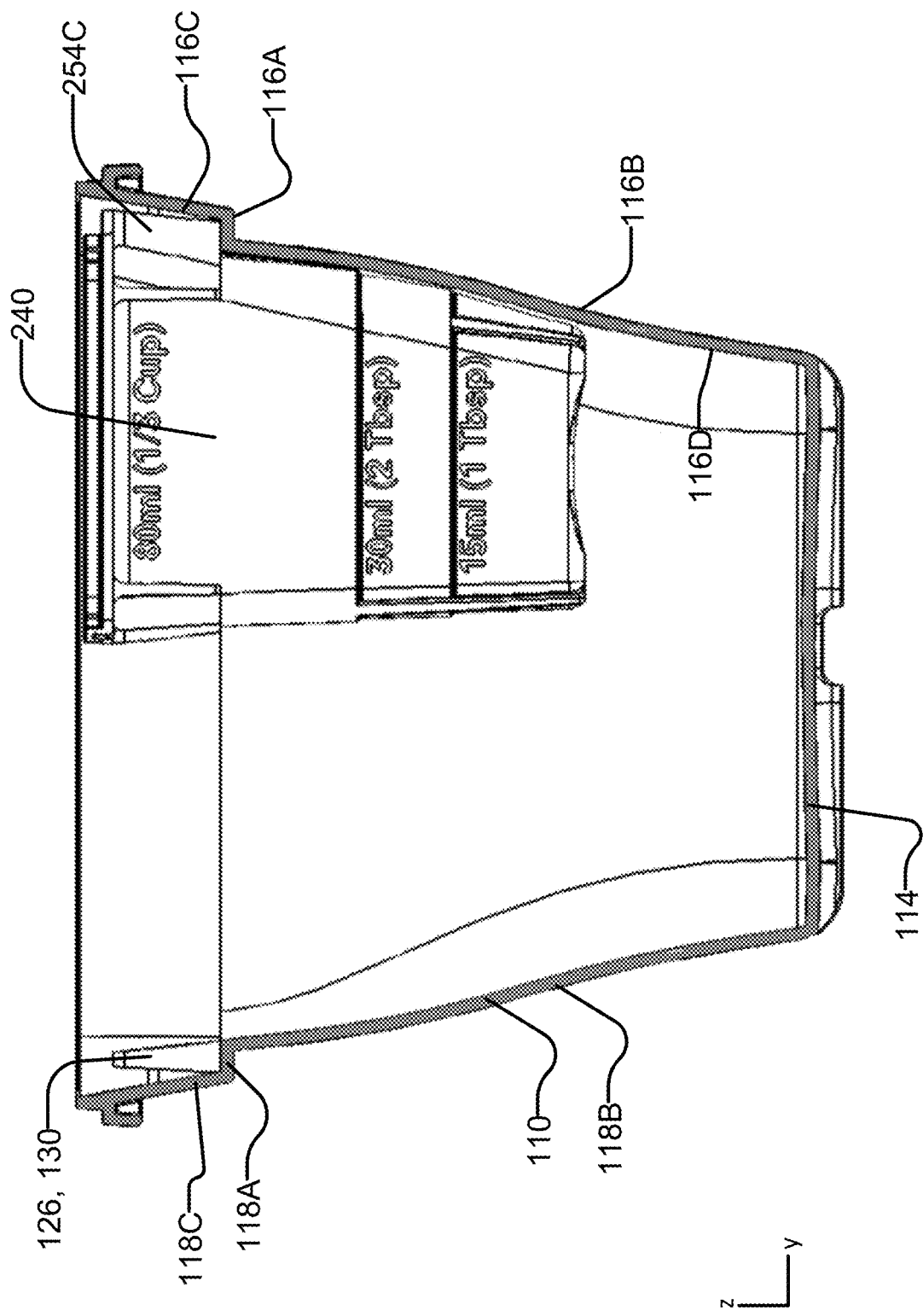
FIG. 8 is a front view of a yz-plane cross-section of the main container of FIG. 2 showing the cup of FIG. 7A installed.

FIG. 8 depicts a cup 240 installed in a main container 110. As cup 240 is lowered into cavity 112, cup 240 is aligned such that a first support feature 128 is aligned with recess 254 of cup 240. As first support feature 128 enters recess 254, the tapered wedge-like shape of first support feature 128 may contact an inner surface of one or more of hook endwall 254A, opposing hook sidewalls 254B, 254C and endwall 250. Once cup 240 is installed on first support feature 128, a top 126E of first support feature 128 may contact a bottom 252A of lip 252. Furthermore, a bottom edge 254E of hook sidewall 254B and a bottom edge 254F of hook sidewall 254C may contact shoulder 116A as shown in FIG. 8.

As best seen in FIG. 8, endwall 250 of cup 240 may contact inner surface 116D of first sidewall 116 when cup 240 is installed on first support feature 128. This is not mandatory. In particular, as weight is added to cup 240 (e.g. by placing meal ingredients in cavity 243), endwall 250 of cup 240 may be forced (e.g. due to gravity) against lower portion 116B of first sidewall 116. First sidewall 116 may thereby support at least some weight of cup 240 and its contents (e.g. meal ingredients in cavity 243). Contact of endwall 250 with first sidewall 116 may prevent or reduce movement of cup 240.

In some embodiments, one or more secondary support features (e.g. ledges, bumps, grooves, indents, etc.) are provided on endwalls of cups 140 (e.g. endwall 250) and/or inner surface 116D of first sidewall 116 (or an inner surface 118D of second sidewall 118). Such features may improve alignment of cups 140 and main container 110, further support at least some weight of cups 140 and/or prevent undesirable movement of cups 140 relative to main container 110. In some embodiments, a secondary support feature of an endwall of a cup 140 could be complementary to a secondary support feature on inner surface 116D of first sidewall 116 (or an inner surface of second sidewall 118).

In some embodiments, endwalls of cups 140 (or one or more secondary support features thereof) may be shaped and sized such that contact of endwalls of a cup 140 (or one or more secondary support features thereof) with inner surface 116D of first sidewall 116 causes said cup 140 to be angled upward away from first sidewall 116 such that a distal end of said cup 140 is slightly higher than a proximate (e.g. near first sidewall 161) end of cup 140. Such upward angling of cup 140 may improve the seal of cup 140 with lid 170.

The weight of cup 240 and its contents may be supported by one or more of:
  contact of top 126E of first support feature 128 and bottom 252A of lip 252;
  contact of bottom edge 254E of hook sidewall 254B and bottom edge 254F of hook sidewall 254C with shoulder 116A;
  contact of first support feature 128 with one or more of hook endwall 254A, opposing hook sidewalls 254B, 254C and endwall 250;

contact of the surfaces defining cutout 254D with reinforcement 126C; and contact of endwall 250 of cup 240 with inner surface 116D of first sidewall 116.

While cup 240 is supported by a single first support feature 128, this is not strictly necessary. A cup 140 could be supported by two or more first support features 128. In some embodiments, each cup 140 is supportable by nm support features 126. For example, cup 340 (as shown in FIG. 1) may be supported by two support features 126 since for cup 340 n=2 and m=1 and therefore nm=2. Cup 340 may be substantially similar to cup 240 except that the endwalls and recess 156 of cup 340 are wider. In particular, recess 156 of cup 340 is sufficiently large in the y-direction to receive two support features 126 and the cutout of the hook of cup 340 is sufficiently large in the x-direction to receive two reinforcements 126C.

While cup 240 and cup 340 are supported by first support features 128 and not second support features 130, this is not necessary. For example, cup 240 and cup 340 could each be supported by second support features 130 and not first support features 128. Furthermore, a cup 140 could bridge across opening 124 of main container 110 and be supported by one or more first support features 128 and one or more second support features 130 like cups 440, 540, 640 shown in FIG. 1.

Figure 9:
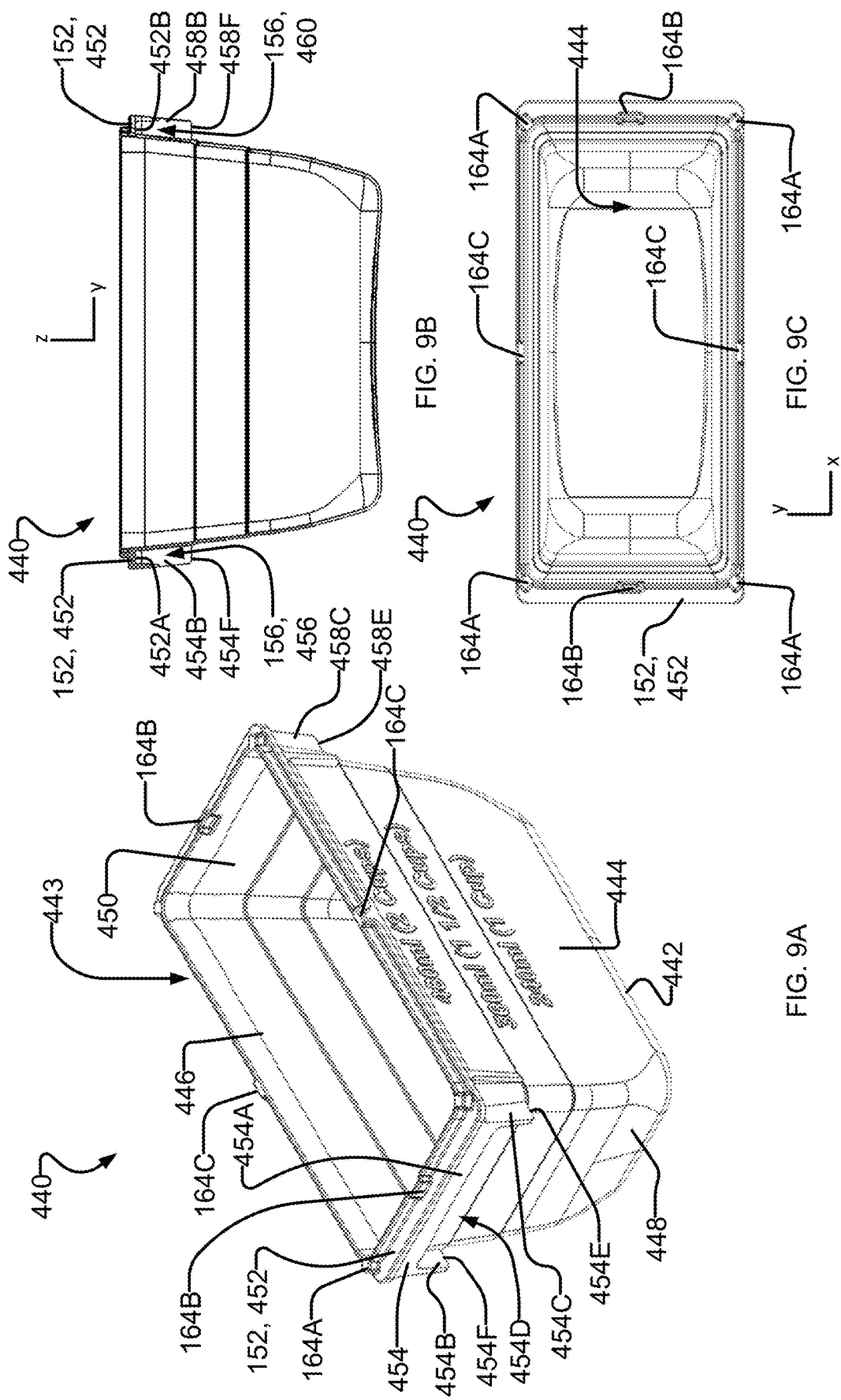
FIG. 9A is an isometric view of a cup of a meal kit delivery container according to one exemplary embodiment of the invention.
FIG. 9B is a front view of a yz-plane cross-section of the cup of FIG. 9A.
FIG. 9C is a top view of the cup of FIG. 9A.

FIGS. 9A, 9B and 9C depict an exemplary cup 440. Cup 440 may be substantially similar to cup 240 except that it is larger in the x and y-directions and is supportable in cavity 112 of main container 110 by two first support features 128 and two second support features 130. Like cup 240, cup 440 defines a cavity 443. Cavity 443 is defined by a base 442, first and second sidewalls 444, 446 and first and second endwalls 448, 450.

In some embodiments, cup 440 is tapered to allow cups 440 to be stacked and/or to fit within the tapered shape of main container 110. For example, as can be seen from FIGS. 9A and 9B, first and second sidewalls 444, 446 extend at least partially outwardly in the x-direction from base 442 and first and second endwalls 448, 450 extend at least partially outwardly in the y-direction from base 442.

Cup 440 may comprise a lip 452 that extends outwardly (e.g. at least partially in the x or y-directions) around at least a portion of the perimeter of the opening of cup 440. For example, lip 452 may extend outwardly from a top edge (e.g. an edge distal to base 442) of first and second sidewalls 444, 446 and/or a top edge (e.g. an edge distal to base 442) of first and second endwalls 448, 450. As shown in FIG. 9A, lip 452 may be continuous around the perimeter of the opening of cup 440. This is not mandatory.

A first hook 454 may protrude from lip 252. First hook 454 may comprise a hook endwall 454A and opposing hook sidewalls 454B, 454C. Hook endwall 454A, opposing hook sidewalls 454B, 454C and endwall 448 may together define a first recess 456 for receiving one or more support features 126.

A second hook 458 may protrude from lip 252. Second hook 458 may comprise a hook endwall 458A and opposing hook sidewalls 458B, 458C. Hook endwall 458A, opposing hook sidewalls 458B, 458C and endwall 450 may together define a second recess 460 for receiving one or more support features 126.

First and second recesses 456, 460 may be complementary in shape to one or more support features 126. In particular, recesses 456, 460 may be tapered in the x and y-directions along the z-direction similar to support features 126. Hook endwalls 454A, 456A may define cutouts 454D, 456D respectively. Cutouts 454D, 456D may each be complementary in shape to reinforcements 126C such that reinforcements 126C do not interfere with insertion of support features 126 into recesses 456, 460. Moreover, the complementary shapes of cutouts 454D, 456D and reinforcements 126C may reduce undesirable movement between cup 440 and main container 110.

Figure 10:
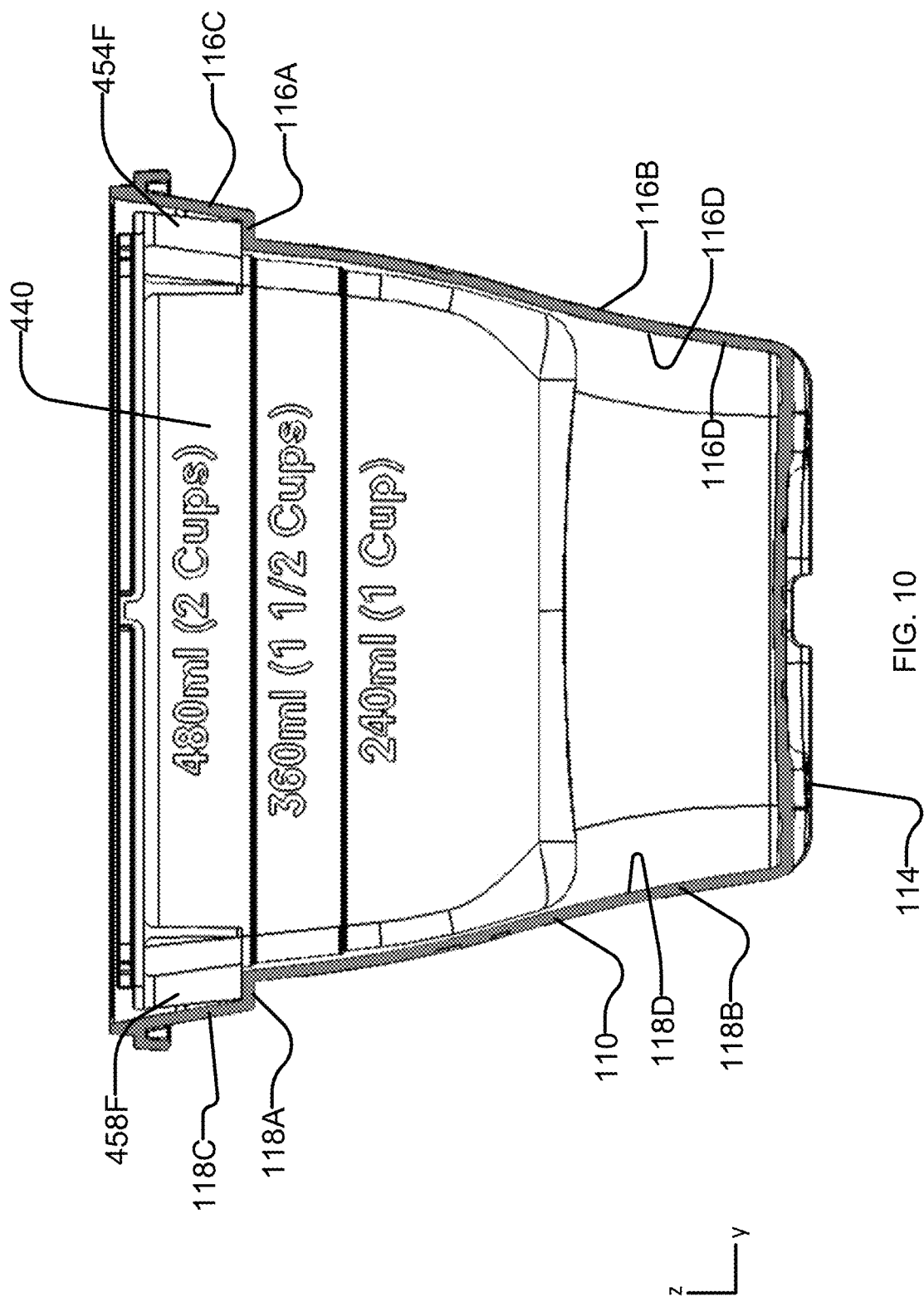
FIG. 10 is a front view of a yz-plane cross-section of the main container of FIG. 2 showing the cup of FIG. 9A installed.

FIG. 10 depicts a cup 440 installed in a main container 110. As cup 440 is lowered into cavity 114, cup 440 is aligned such that two first support features 128 are aligned with first recess 456 of cup 440 and two second support features 130 are aligned with second recess 460 of cup 440. As first support features 128 enter first recess 456, the tapered wedge-like shapes of first support features 128 may contact an inner surface of one or more of hook endwall 454A, opposing hook sidewalls 454B, 454C and endwall 448. Similarly, as second support features 130 enter second recess 460, the tapered wedge-like shapes of second support features 130 may contact an inner surface of one or more of hook endwall 458A, opposing hook sidewalls 458B, 458C and endwall 450.

Once cup 440 is installed on first support features 128, tops 126C of first support features 128 may contact a first bottom portion 452A of lip 452 and tops 126C of second support features 130 may contact a second bottom portion 452B of lip 452. Furthermore, a bottom edge 454E of hook sidewall 454B and a bottom edge 454F of hook sidewall 454C of hook 454 may contact shoulder 116A and a bottom edge 458E of hook sidewall 458B and a bottom edge 458F of hook sidewall 458C of hook 458 may contact shoulder 118A as shown in FIG. 10.

As best seen in FIG. 10, endwall 448 of cup 440 may contact inner surface 116D of lower portion 116B of first sidewall 116 when cup 440 is installed on first support features 128 and endwall 450 of cup 440 may contact inner surface 118D lower portion 118B of second sidewall 118 when cup 440 is installed on second support features 130. In particular, as weight is added to cup 440 (e.g. by placing meal ingredients in cavity 443), endwall 448 of cup 440 may be forced (e.g. due to gravity) against lower portion 116B of first sidewall 116 and endwall 450 of cup 440 may be forced (e.g. due to gravity) against lower portion 118B of second sidewall 118. Contact of endwalls 448, 450 and first and second sidewalls 116, 118 may prevent or reduce movement of cup 440. First sidewall 116 and second sidewall 118 may also support at least some weight of cup 440 and its contents (e.g. meal ingredients in cavity 443).

The weight of cup 440 and its contents may be supported by one or more of:

contact of tops 126E of first support features 128 and first bottom portion 452A of lip 452;

contact of tops 126E of second support features 130 and second bottom portion 452B of lip 452;

contact of bottom edge 454E of hook sidewall 454B and bottom edge 454F of hook sidewall 454C with shoulder 116A;

contact of bottom edge 458E of hook sidewall 458B and bottom edge 458F of hook sidewall 458C with shoulder 118A;

contact of first support features 128 with one or more of hook endwall 454A, opposing hook sidewalls 454B, 454C and first endwall 448;

contact of second support features 130 with one or more of hook endwall 458A, opposing hook sidewalls 458B, 458C and second endwall 450;

contact of the surfaces defining cutout 454D with reinforcement 126C;

contact of the surfaces defining cutout 458D with reinforcement 130C;

contact of first endwall 448 of cup 440 with inner surface 116D of first sidewall 116; and contact of second endwall 450 of cup 440 with inner surface 118D of second sidewall 118.

While cup 440 is supported by two first support features 128 and two second support features 230, this is not strictly necessary. A cup 140 could be supported by three or more first support features 128 and three or more second support features 130. For example, cup 540 (as shown in FIG. 1) may be supported by three first support features 128 and three second support features 130. Cup 540 may be substantially similar to cup 440 except that the endwalls and recesses 156 of cup 540 are wider. In particular, the recesses 156 of cup 540 are sufficiently wide to receive three first support features 128 and three second support features 130 respectively and the cutouts of the hooks of cup 440 are sufficiently wide to receive three reinforcements 126C.

A cup 140 could also be supported by one first support feature 128 and one second support feature 130. For example, cup 640 (as shown in FIG. 1) may be supported by one first support feature 128 and one second support feature 130. Cup 640 may be substantially similar to cup 440 except that the endwalls and recesses 156 of cup 540 are smaller in the x-direction. In particular, the recesses 156 of cup 640 are only sufficiently wide to receive one first support feature 128 or one second support feature 130 and the cutouts of the hooks of cup 440 are only sufficiently wide to receive one reinforcement 126C.

Although not depicted, it should be understood that a cup 140 could be provided that is supportable by n first support features 128 and n* second support features 130 where n≠n*.

Figure 11:
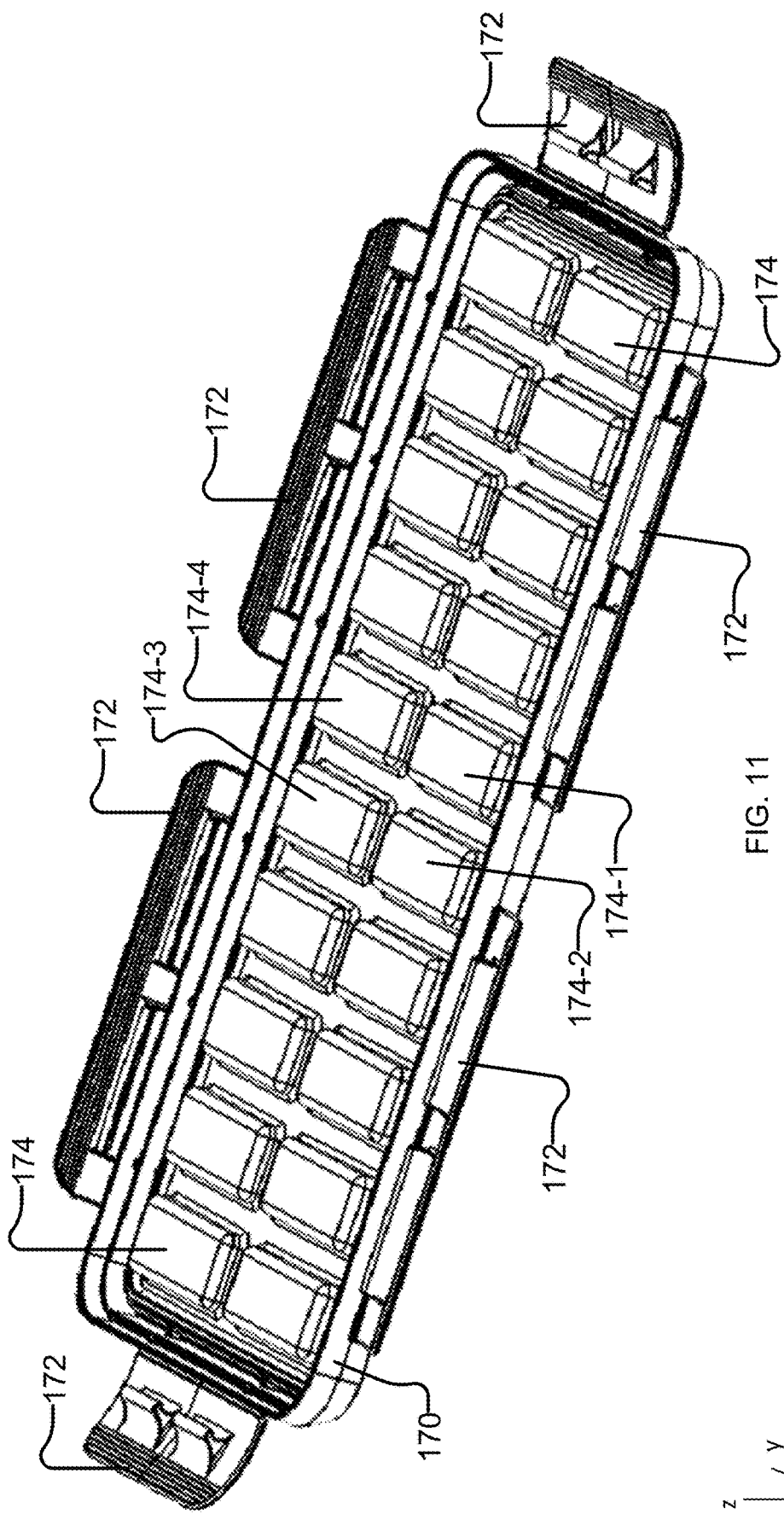
FIG. 11 is an isometric view of a lid of a meal kit delivery container according to one exemplary embodiment of the invention.

FIG. 11 depicts a lid 170 according to one exemplary embodiment of the invention. Lid 170 may be attached to main container 110 in any suitable manner. For example, as depicted, lid 170 may comprise a plurality of snaps 172 which may be snapped onto a lip 132 of main container 110. This is not mandatory. Lid 170 could also be attached to main container 110 using a hinge, press-fit, screw-fit, clamp-fit or any other suitable mechanism.

In some embodiments, lid 170 comprises a plurality of plateaus 174. This is not mandatory. Plateaus 174 may be arranged in a two-dimensional array. Each plateau 174 may have a similar size and shape. Each plateau may protrude in the z-direction from an inner surface 170A of lid 170. Each plateau 174, on its own, or together with adjacent and/or opposing plateaus 174 may seal or partially seal each cup 140 (e.g. cups 240, 340, 440, 540 etc.) within main container 110 when lid 170 is installed on main container 110. As such, independent of what combination of shapes and sizes of cups 140 is installed within main container 110, plateaus 174 may seal or partially seal each cup 140.

For example, each plateau 174 may correspond generally in size and shape to one or more cups 140. Specifically, plateau 174-1 may be complementary in size and shape to an opening of cavity 243 of a cup having n=1 and m=1 (e.g. cup 240 or cup 740).

When combined, plateaus 174 may be complementary in size and shape to openings of cavities 143 of various cups 140. In the illustrated embodiment, each pair of adjacent plateau's 174 may together be complementary in shape to a cup 140 having n=2 and m=1 (e.g. cup 340). Specifically, adjacent plateaus 174-1, 174-2 may together be complementary in size and shape to an opening of cavity 343 of cup 340. Each pair of opposing plateau's 174 may together be complementary in shape to a cup 140 having n=1 and m=2 (e.g. cup 640). Specifically, opposing plateaus 174-1, 174-4 may together be complementary in size and shape to an opening of the cavity 143 of cup 640. Two opposing pairs of adjacent plateau's may together be complementary in shape to a cup 140 having n=2 and m=2 (e.g. cup 440). Specifically, plateau's 174-1, 174-2, 174-3, 174-4 may together be complementary in size and shape to an opening of the cavity 143 of cup 440.

Figure 12:
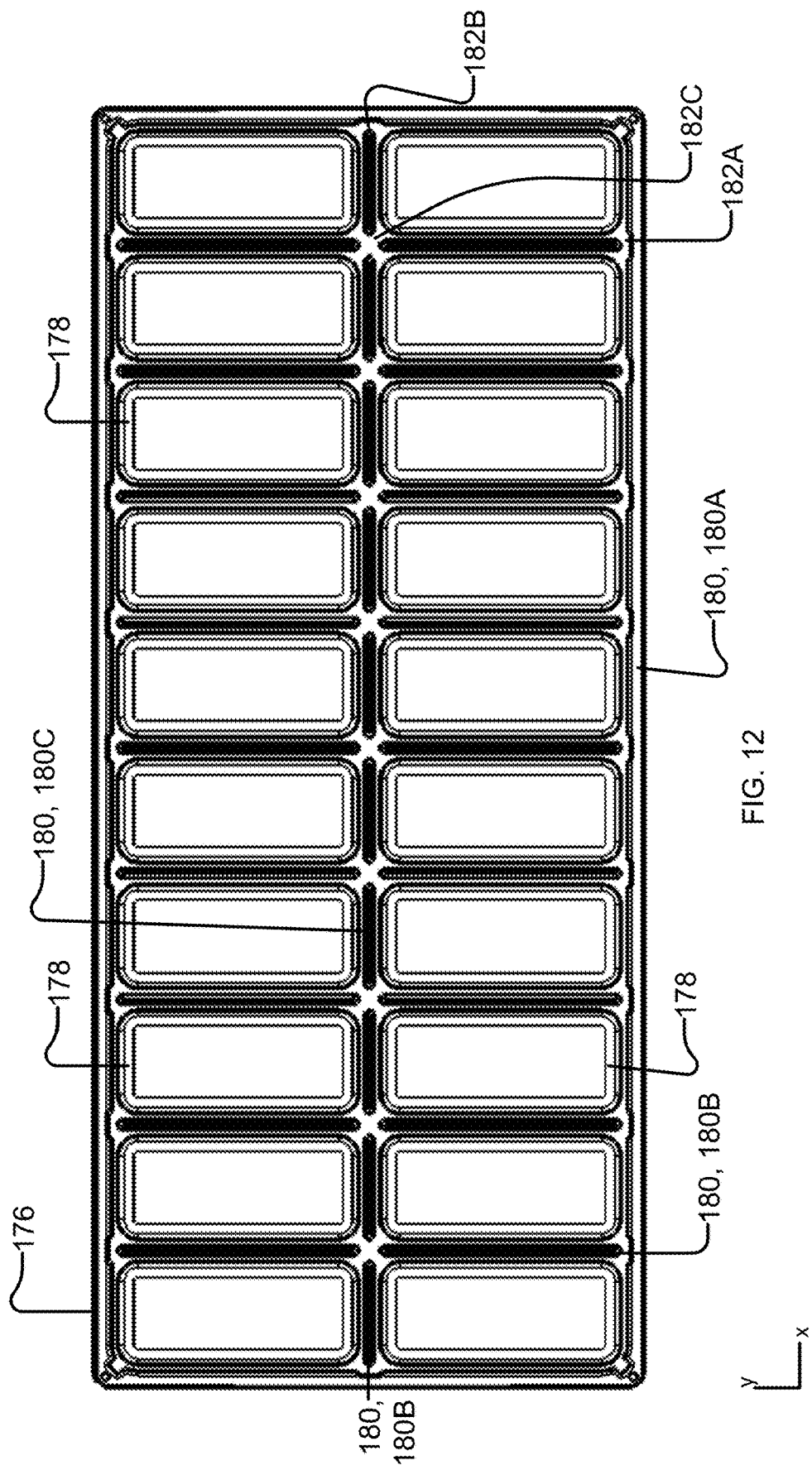
FIG. 12 is a top view of a gasket of the lid of FIG. 11 according to an exemplary embodiment of the invention.

To improve the seal between plateaus 174 and cups 140, a gasket 176 may optionally be provided. Gasket 176 may fill a gap or gaps between plateaus 174 and cups 140 (e.g. lips 152 of cups 140) to improve a seal between lid 170 and cups 140. FIG. 12 depicts a gasket 176 according to one exemplary embodiment of the invention. Gasket 176 may be a single contiguous piece of material or gasket 176 may comprise a plurality of parts. Gasket 176 may be attached to lid 170 by friction, a deformation fit, glue, bonding or in any other suitable manner. In some embodiments, gasket 176 is co-molded with lid 170. In some embodiments, gasket 176 is integral with lid 170. In some embodiments, gasket 176 is integral to lid 270. In some embodiments, gasket 176 is sandwiched between lid 170 and main container 110.

Gasket 176 may comprise inner sealing features 178 and outer sealing features 180. Together, inner and outer sealing features 178, 180 may seal or substantially seal cups 140 and main container 110 such that solids and liquids do not leak out of (or enter) cups 140 or main container 110 when sealed container 100 is jostled, flipped upside down or shaken.

Figure 13:
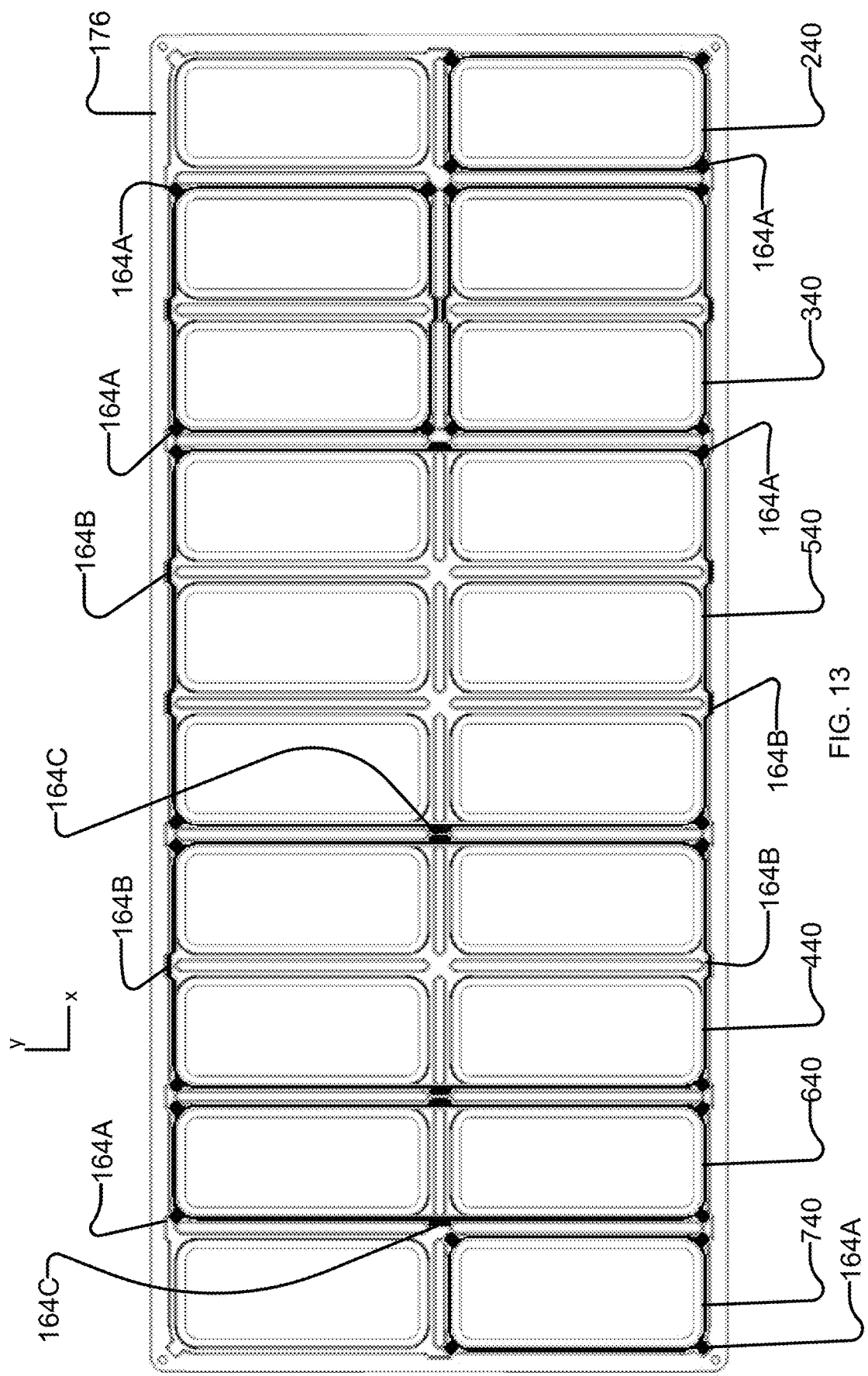
FIG. 13 is a top view of the gasket of FIG. 12 showing outlines of sidewalls, endwalls and protrusions of cups of a meal kit delivery container according to one exemplary embodiment of the invention.

FIG. 13 depicts gasket 176 and outlines of the endwalls (e.g. endwalls 248, 250, endwalls 348, 350, etc.) and sidewalls (e.g. sidewalls 244, 246, sidewalls 344, 346, etc.) at the opening of cavities 143 of cups 140. As best seen in FIG. 13, when lid 170 (with gasket 176) is locked on main container 110, inner sealing features 178 may be located between one or more plateaus 174 and inner surfaces of the endwalls (e.g. endwalls 248, 250, endwalls 348, 350, etc.) and sidewalls (e.g. sidewalls 244, 246, sidewalls 344, 346, etc.) at the opening of cavities 143 of cups 140.

Outer sealing features 180 comprise outer sealing wall 180A, outer sealing walls 180B and outer sealing walls 180C, as shown in FIG. 12. When lid 170 (with gasket 176) is locked on main container 110, outer sealing features 180 may be located between outer surfaces of the endwalls (e.g. endwalls 248, 250, endwalls 348, 350, etc.) and sidewalls (e.g. sidewalls 244, 246, sidewalls 344, 346, etc.) at the opening of cavities 143 of cups 140.

To allow for cups having n>1 (e.g. cups 340, 440, etc.), gaps 182A are provided between outer sealing wall 180A and outer sealing walls 180B and gaps 182C are provided between outer sealing walls 180B and outer sealing walls 180C. For example, as shown in FIG. 13, endwall 348 of cup 340 (which has n=2) passes through gap 182A such that outer sealing features 180 do not interfere with endwall 348.

Similarly, to allow for cups having m>1, gaps 182B are provided between outer sealing wall 180A and outer sealing walls 180C and gaps 182C are provided between outer sealing walls 180B and outer sealing walls 180C. For example, as shown in FIG. 13, sidewall 346 of cup 340, which has m=2, passes through gaps 182C such that outer sealing features 180 do not interfere with sidewall 346.

To reduce a risk that gaps 182A, 182B, 182C may hamper the sealing capabilities of gasket 176, cups 140 may have one or more protrusions that fill one or more of gaps 182A, 182B, 182C. In particular, cups 140 may comprise one or more corner protrusions. This is not mandatory—in some embodiments, corner protrusions 164A are omitted. Corner protrusions 164A may fill one or more of gaps 182A, 182B, 182C. For example, as can be seen in FIGS. 7A and 7C, cup 240 comprises a corner protrusion 164A protruding from and above lip 252 at each corner formed between sidewalls 244, 246 and endwalls 248, 250. As can be seen in FIG. 13, corner protrusions 164A fill gaps (e.g. are complementary to) 182A, 182B and 182C around cup 240. As such, corner protrusions 164A may reduce the risk of leakage from cup 240 and improve the seal between cup 240 and lid 170.

Cups 140 may also comprise one or more endwall protrusions 164B to fill gaps 182A, 182C. This is not mandatory—in some embodiments, endwall protrusions 164B are omitted. For example, in addition to corner protrusions 164A, cup 440 also comprises endwall protrusions 164B protruding from and above lip 452 along endwalls 448, 450. As can be seen in FIG. 13, endwall protrusions 164A fill (e.g. are complementary to) gaps 182A around cup 340. As such, endwall protrusions 164B may reduce the risk of leakage from cup 340 and improve the seal between cup 440 and lid 170.

Cups 140 may also comprise one or more sidewall protrusions 164C to fill gap 182B, 182C. This is not mandatory. For example, in addition to corner protrusions 164A and endwall protrusions 164B, cup 340 comprises sidewall protrusions 164C protruding from and above lip 452 along sidewalls 444, 446. As can be seen in FIG. 13, sidewall protrusions 164A fill (e.g. are complementary to) gaps 182C around cup 340. As such, sidewall protrusions 164C may reduce the risk of leakage from cup 440 and improve the seal between cup 340 and lid 170.

Protrusions 164A, 164B, 164C may be rounded or squared as may be complementary to gaps 182A, 182B, 182C. Protrusions 164A, 164B, 164C may be coplanar (in an xy-plane) with a topmost edge of cups 140 such to provide a consistent seal between cups 140 and gasket 176 and/or lid 170.

In some embodiments, gasket 176 is fabricated from a softer material than lid 170. For example, in some embodiments, gasket 176 comprises rubber or an elastomeric material. In some embodiments, gasket 176 comprises a support structure such as an internal skeleton made of a relatively more rigid material.

When lid 170 is locked on main container 110, gasket 176 may have an abutment fit with one or more of endwalls (e.g. endwalls 248, 250, endwalls 348, 350, etc.), sidewalls (e.g. sidewalls 244, 246, sidewalls 344, 346, etc.) and protrusions 164A, 164B, 164C of cups 140 such that there is contact between the endwalls, sidewalls and protrusions of cups 140 with gasket 176 but gasket 176 is not substantially deformed.

Alternatively, gasket 176 may have a deformation fit with one or more of endwalls (e.g. endwalls 248, 250, endwalls 348, 350, etc.), sidewalls (e.g. sidewalls 244, 246, sidewalls 344, 346, etc.) and protrusions 164A, 164B, 164C of cups 140 such that there is contact between the endwalls, sidewalls and protrusions of cups 140 with gasket 176 which cause gasket 176 to be deformed.

Alternatively, gasket 176 may have a restorative deformation fit with endwalls (e.g. endwalls 248, 250, endwalls 348, 350, etc.), sidewalls (e.g. sidewalls 244, 246, sidewalls 344, 346, etc.) and protrusions 164A, 164B, 164C of cups 140 such that there is contact between the endwalls, sidewalls and protrusions of cups 140 with gasket 176 which causes gasket 176 to be elastically deformed. In this case, restorative deformation forces (associated with a bias of the material of gasket 176 to return to its non-deformed shape) apply pressure against endwalls, sidewalls and protrusions of cups 140 to thereby improve the seal between gasket 176 and cups 140.

In some embodiments, lid 170 does not comprise plateaus 174 and gasket 176 may be sufficiently stiff to accommodate any structure that plateaus 174 may have otherwise provided.

Figure 14:
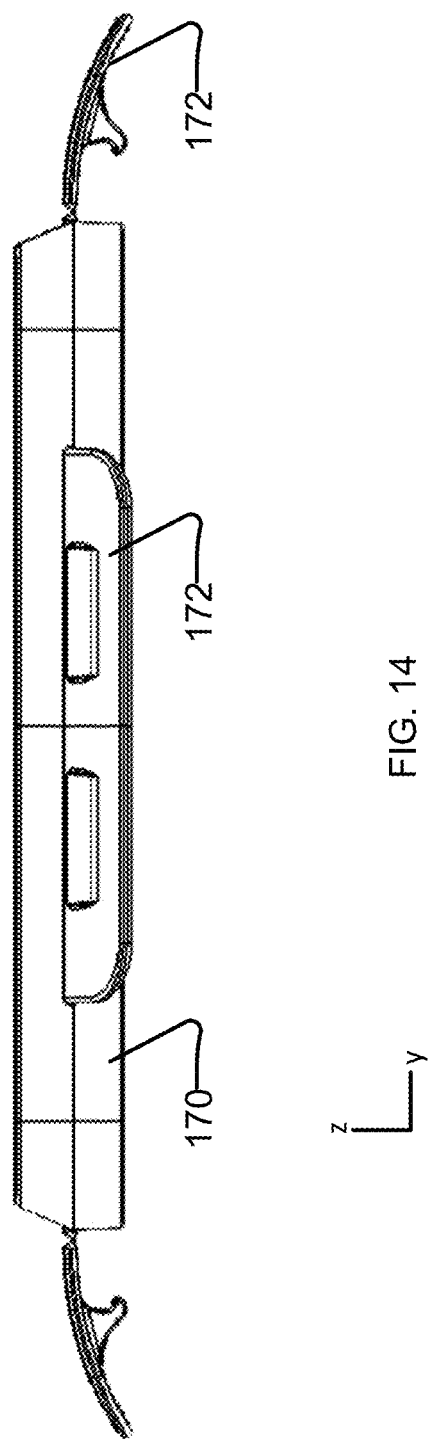
FIG. 14 is a front view of a lid of a meal kit delivery container according to one exemplary embodiment of the invention.

In some embodiments, lid 170 is bowed across the y-direction (e.g. the midpoint of lid 170 as shown in FIG. 14 is lower than the y-direction end points of lid 170) to improve contact between lid 170 and/or gasket 176 of lid 170 with cups 140. In particular, lid 170 may be bowed across the y-direction to improve contact between 170 and/or gasket 176 of lid 170 with cups 140 having m=1 since cups having m=1 may be more likely to flex or deflect downward at endwall 248 when mounted on support feature(s) 126.

Figure 15:
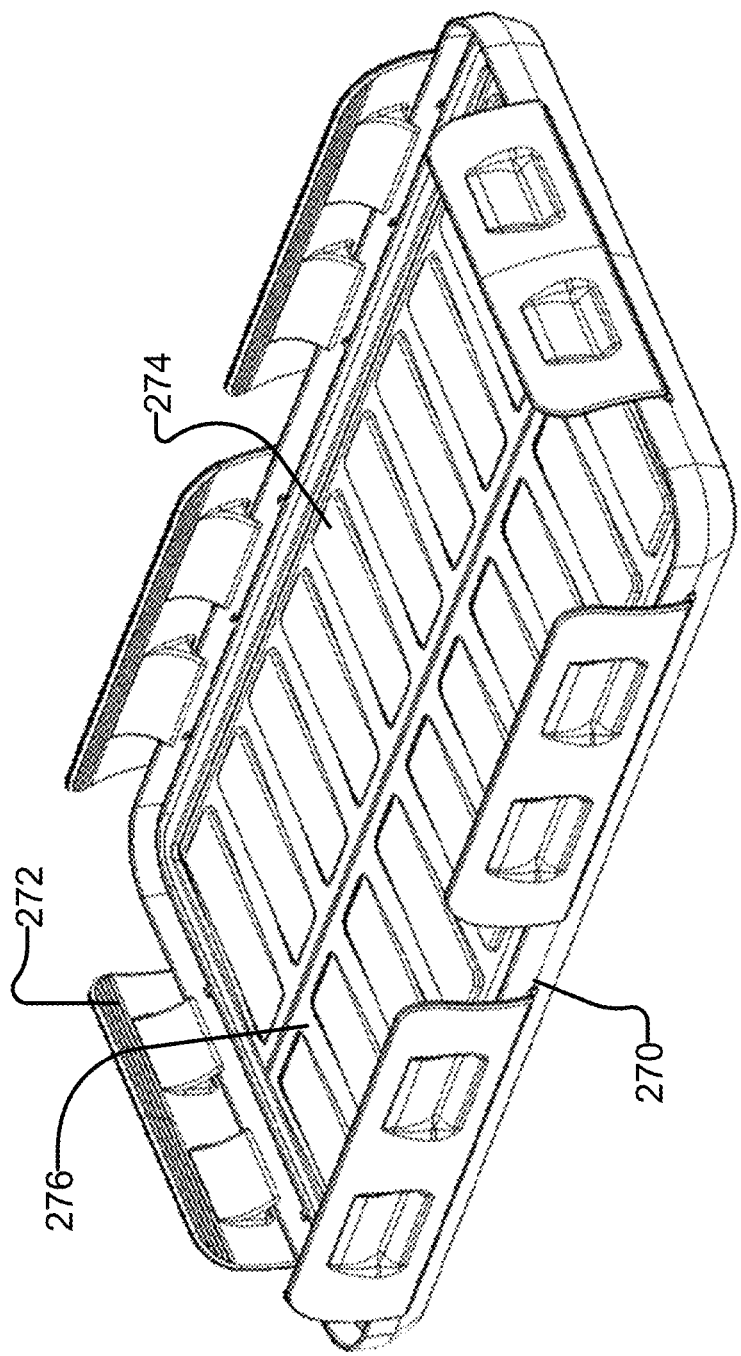
FIG. 15 is an isometric bottom view of a lid of a meal kit delivery container according to another exemplary embodiment of the invention.

FIG. 15 depicts a lid 270 according to another exemplary embodiment of the invention. Lid 270 may be substantially similar to lid 170 except as follows. For example, lid 270 may comprise snaps 272 and a plurality of plateaus 274. Snaps 272 may be similar to snaps 172. Plateaus 274 may be similar to plateaus 174.

Figure 16:
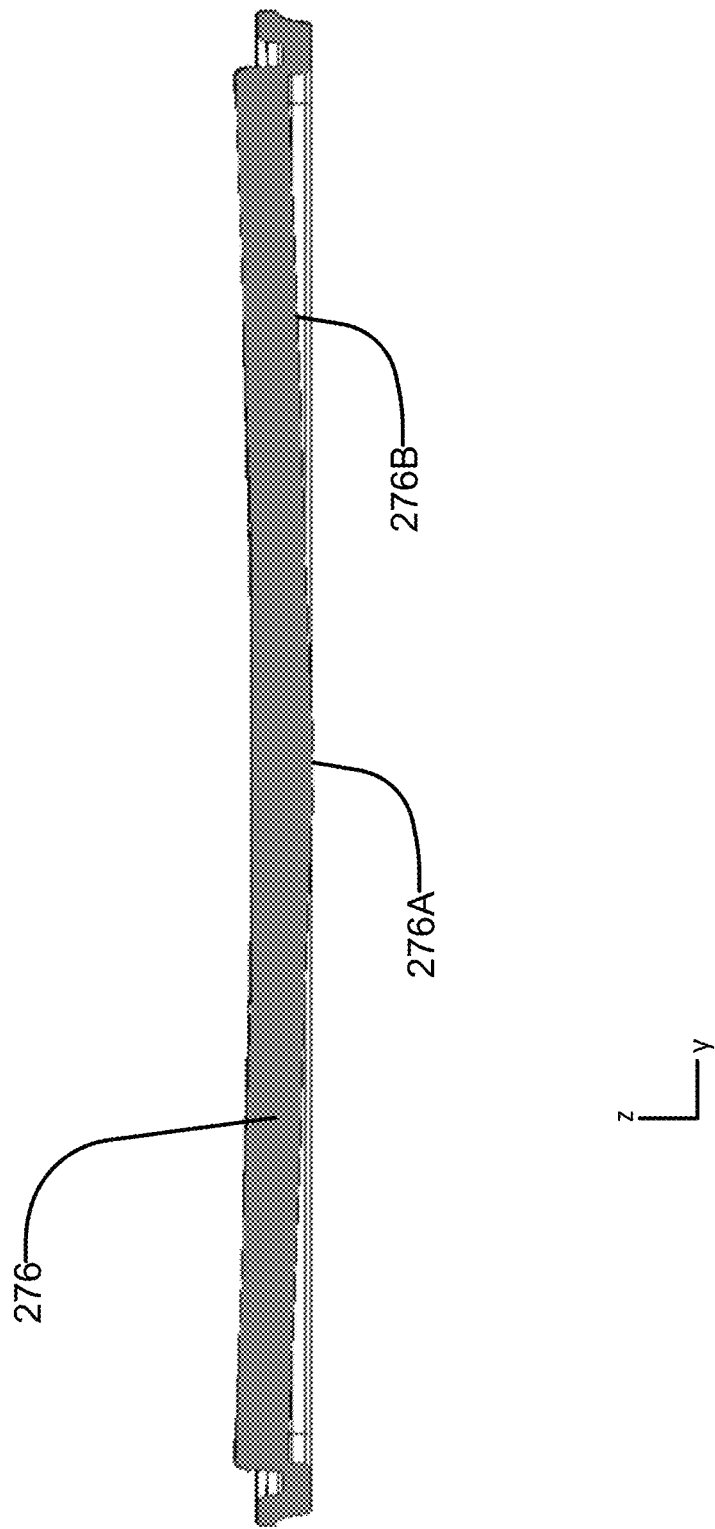
FIG. 16 is a front view of a yz-plane cross-section of the gasket of FIG. 15.

To improve the seal between plateaus 274 and cups 140, a gasket 276 may be provided. FIG. 16 depicts a gasket 276 according to one exemplary embodiment of the invention. Gasket 276 may be a single contiguous piece of material or gasket 276 may comprise a plurality of parts. Gasket 276 may be attached to lid 270 by friction, a deformation fit, glue, bonding or in any other suitable manner. In some embodiments, gasket 276 is co-molded with lid 270.

Unlike gasket 176, gasket 276 does not comprise inner and outer sealing features. Instead, gasket 276 is configured to have a deformation fit (or restorative deformation fit) with one or more of endwalls (e.g. endwalls 248, 250, endwalls 348, 350, etc.), sidewalls (e.g. sidewalls 244, 246, sidewalls 344, 346, etc.) and protrusions 164A, 164B, 164C of cups 140 such that there is contact between the endwalls, sidewalls and protrusions of cups 140 with gasket 276 which cause gasket 276 to be deformed. Such deformation of gasket 276 creates a seal between cups 140 and gasket 276. In some embodiments, gasket 276 is sufficiently thick (e.g. in the z-direction) to allow gasket 276 to deform by between 1 mm and 6 mm in the z-direction when lid 270 is installed on main container 110. In some embodiments, gasket 276 is sufficiently thick (e.g. in the z-direction) to allow gasket 276 to deform by between 2 mm and 4 mm in the z-direction when lid 270 is installed on main container 110.

In some embodiments, to improve a seal between gasket 276 and cups 140, cups 140 do not comprise one or more of protrusions 164A, 164B, 164C.

In some embodiments, lid 270 is bowed across the y-direction like lid 170, to improve contact between lid 270 and/or gasket 276 of lid 270 with cups 140. In particular, lid 270 may be bowed across the y-direction to improve contact between lid 270 and/or gasket 276 of lid 270 with cups 140 having m=1 since cups having m=1 may be more likely to flex or deflect downward at endwall 248 when mounted on support feature(s) 126.

In some embodiments, gasket 276 is beveled across the y-direction (e.g. the midpoint 276A of lid gasket 276 as shown in FIG. 16 is thicker in the z-direction than the y-direction end points of gasket 276). Gasket 276 may be beveled such that a contact surface 276B of gasket 276 is relatively flat (e.g. relatively un-curved) to mate with the relatively flat lips (e.g. lips 252, 352, etc.) of cups 140. Gasket 276 may be beveled across the y-direction to improve contact between lid 270 and/or gasket 276 of lid 270 with cups 140 having m=1 since cups having m=1 may be more likely to flex or deflect downward at endwall 248 when mounted on support feature(s) 126.

Figure 17:
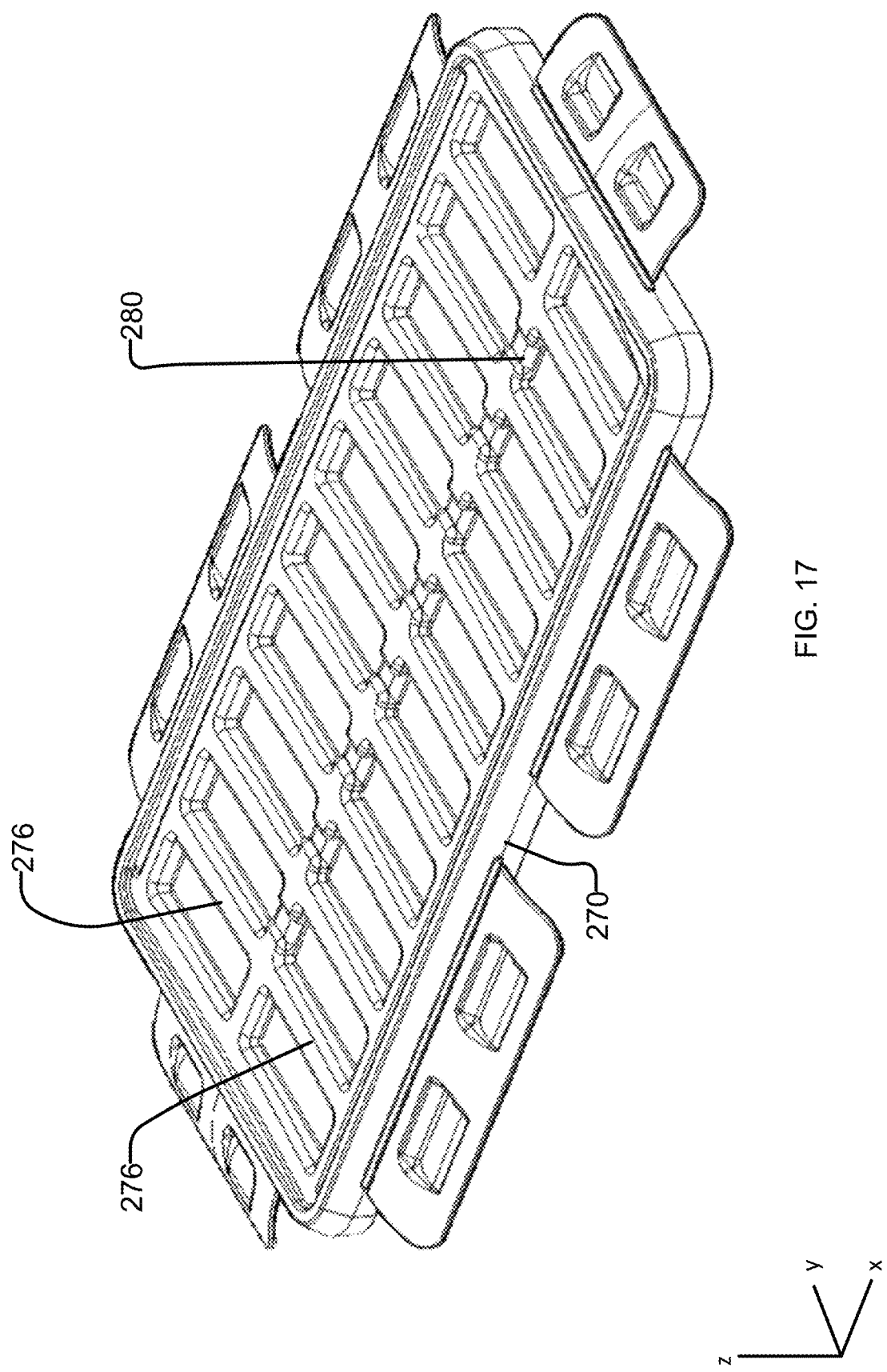
FIG. 17 is an isometric top view of the lid of FIG. 15.

As shown, for example, in FIG. 17, lid 270 may comprise one or more ribs 278. Ribs 278 may increase a stiffness of lid 270 in the x-direction and/or the y-direction. In some embodiments, lid 270 may comprise a spine 280. Spine 280 may increase a stiffness of lid 270 in the x-direction and/or the y-direction. In some embodiments, an outer surface of base 114 comprises one or more features which can be mated with rib 278 and/or spine 280 to facilitate stacking of containers 100.

Figure 18:
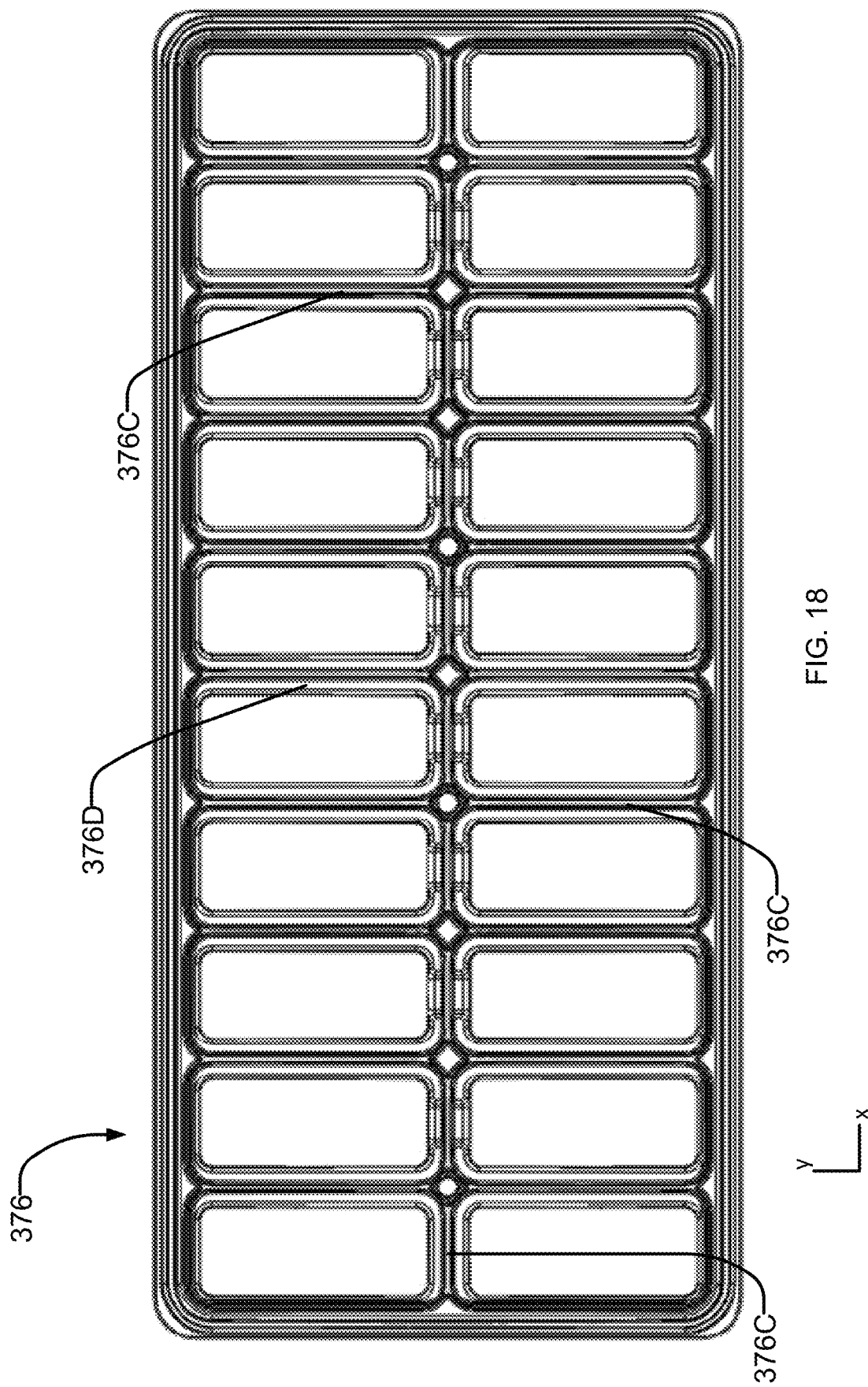
FIG. 18 is a bottom view of a gasket according to an exemplary embodiment of the invention.

FIGS. 18 and 19 depict a gasket 376 according to one exemplary embodiment of the invention. Gasket 376 is substantially similar to gasket 276 except as follows. Gasket 376 may be attached to a lid (e.g. lid 170 or lid 270) by friction, a deformation fit, glue, bonding or in any other suitable manner. In some embodiments, gasket 376 is co-molded with a lid (e.g. lid 170 or lid 270). In some embodiments, gasket 376 is integral to a lid (e.g. lid 170 or lid 270).

Like gasket 276, gasket 376 does not comprise inner and outer sealing features and gasket 376 is configured to have a deformation fit (or restorative deformation fit) with one or more of endwalls (e.g. endwalls 248, 250, endwalls 348, 350, etc.), sidewalls (e.g. sidewalls 244, 246, sidewalls 344, 346, etc.) and protrusions 164A, 164B, 164C of cups 140 such that there is contact between the endwalls, sidewalls and protrusions of cups 140 with gasket 376 which cause gasket 376 to be deformed. Such deformation of gasket 376 creates a seal between cups 140 and gasket 376.

However, unlike gasket 276, gasket 376 comprises one or more interior channels 376C defined by an interior surface 376D of gasket 376 (e.g. a surface of gasket 376 that faces a lid such as lid 170 or lid 270). Channels 376C may extend in the gaps between plateaus 174 (or plateaus 274). Channels 376C may interconnect or criss-cross. While interior surface 276D of gasket may define channels 376C, an opposite exterior surface of gasket 376 may be substantially similar to that of gasket 276, as shown in FIG. 15.

The interaction between cups 140 and gasket 376 may cause deformation of one or more portions of gasket 376 into interior channels 376C. In this way, interior channels 376C may facilitate deformation of gasket 376 by one or more of endwalls (e.g. endwalls 248, 250, endwalls 348, 350, etc.), sidewalls (e.g. sidewalls 244, 246, sidewalls 344, 346, etc.) and protrusions 164A, 1646, 164C of cups 140. Moreover, channels 376C may allow for deformation of a portion of gasket 376 by a first cup 140 without such deformation affecting (or substantially affecting) the portion of gasket 376 that seals a second adjacent cup 140. In this way, gasket 376 may be better suited to accommodate (e.g. seal) various combinations of cups 140 by allowing for independent (or substantially independent) deformative interaction between gasket 376 and each cup 140.

In some embodiments, where plateaus (e.g. plateaus 174) are not present on a lid (e.g. lid 170 or lid 270), a gasket may have an outer surface (e.g. that contacts cups 140) that is substantially uniform and flat (e.g. the outer surface does not define any apertures). In such an embodiment, the gasket may comprise one or more interior channels defined by an interior surface of the gasket (e.g. a surface of the gasket that faces a lid).

In some embodiments, in addition to (or in the alternative to) a gasket (e.g. gasket 176 or gasket 276), lips 152 of cups 140 may comprise a sealing material (e.g. a rubber or elastomeric material). This sealing material may be bonded to lips 152 or co-molded with cups 140 or attached to cups 140 in any suitable manner. This sealing material may improve the seal of individual cups 140 with a lid (e.g. lid 170 or lid 270). The sealing material may have a larger surface area that contacts the lid as compared to lips 152 to improve the seal between cups 140 and lid 170.

In some embodiments, where a gasket (e.g. gasket 176, gasket 276 or the like) is co-molded with a lid (e.g. lid 170, lid 270 or the like), the gasket may extend from the lid in the z-direction but also (at least in part) in the x and or y-directions such that the gasket increases a contact surface area between the lid and cups 140.

In some embodiments, a gasket (e.g. gasket 176, gasket 276 or the like) may comprises multiple z-direction levels of sealing features. For example, the gasket may have features shaped and sized to fit a first size of cup 140 at a first z-direction location, features shaped and sized to fit a second size of cup 140 at a second z-direction location, features shaped and sized to fit a third size of cup 140 at a third z-direction location and so on. In this way, a gasket may have features specific to various sizes of cups without such features interfering with each other.

Interpretation of Terms

Unless the context clearly requires otherwise, throughout the description and the
- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof; elements which are integrally formed may be considered to be connected or coupled;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;
- the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

Where a component (e.g. a cup, container, etc.) is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described herein. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. A container comprising:
    a main container comprising:
        a base;
        first and second longitudinally extending opposing sidewalls extending from the base; and
        first and second transversely extending opposing endwalls extending from the base, each of the first and second opposing endwalls extending from the first sidewall to the second sidewall to define a cavity;
        a plurality of first support features protruding from the first sidewall;
    one or more cups, each cup removably supportable inside the cavity at a location spaced apart from the base of the main container by at least one of the plurality of first support features; and
    a lid attachable to the main container to seal the main container and to seal each of the one or more cups;
    wherein:
        a first cup of the one or more cups is supported by a first first support feature of the plurality of first support features and a lower portion of an inner surface of the first sidewall to cantilever the first cup over and spaced apart from the base;
        an opening-defining edge of the first cup is angled upward away from the first sidewall when the first cup is supported inside the cavity when the lid is not installed on the main container;
        a seal between the lid and the first cup is a liquid-tight seal; and
        the first cup is spaced apart from each of the others of the one or more cups supported inside the cavity, the first endwall, the second endwall and the second sidewall.

2. A container according to claim 1 wherein the main container comprises a plurality of second support features protruding from the second sidewall.

3. A container according to claim 2 wherein the plurality of first support features protrude from a first shoulder of the first sidewall and the plurality of second support features protrude from a second shoulder of the second sidewall.

4. A container according to claim 3 comprising an upper portion of the first sidewall extending from the first shoulder and an upper portion of the second sidewall extending from the second shoulder; wherein:
    a height of the upper portion of the first sidewall as measured from the first shoulder is greater than a height of each of the plurality of first support features as measured from the first shoulder;
    a height of the upper portion of the second sidewall as measured from the second shoulder is greater than a height of each of the plurality of second support features as measured from the second shoulder; and
    the lid is sealable against the upper portion of the first sidewall, the upper portion of the second sidewall and the first and second endwalls.

5. A container according to claim 2 wherein an inner surface of each of the plurality of first support features is substantially co-planar with an inner surface of the first sidewall and an inner surface of each of plurality of second support features is substantially co-planar with an inner surface of the second sidewall.

6. A container according to claim 1 wherein the first cup comprises a first lip and a first hook together defining a first recess for receiving the first first support feature.

7. A container according to claim 1 wherein the first cup is spaced apart from each of the others of the plurality of first support features.

8. A container according to claim 1 wherein the first cup is supported by a second first support feature of the plurality of first support features and is spaced apart from each of the others of the plurality of first support features.

9. A container according to claim 2 comprising a second cup supported by one or more of the plurality of first support features and one or more of the plurality of second support features.

10. A container according to claim 1 wherein the lid comprises a gasket for sealing each of the one or more cups.

11. A container according to claim 10 wherein attaching the lid to the main container causes deformation of the gasket and wherein the deformation of the gasket is caused by interaction of the main container with the gasket and the gasket applies restorative deformation forces against the main container to thereby seal the main container.

12. A container according to claim 10 wherein attaching the lid to the main container causes deformation of the gasket and wherein the deformation of the gasket is caused by interaction of each the one or more cups with the gasket and the gasket applies restorative deformation forces of the gasket against each of the one or more cups to thereby seal each of the one or more cups.

13. A container according to claim 10 wherein the lid comprises a two-dimensional array of plateaus and wherein the gasket fits in gaps between the plateaus to thereby hold the gasket in place relative to the lid to thereby improve a seal between the lid and the main container and between the lid and each of the one or more cups.

14. A container according to claim 13 wherein each of the plateaus correspond in size and shape to an opening of the first cup.

15. A container according to claim 10 wherein a contact surface of the gasket that contacts each of the one or more cups is smooth.

16. A container according to claim 10 wherein a surface of the gasket defines one or more channels for receiving opening-defining edges of each of the one or cups.

17. A container according to claim 16 wherein the one or more channels isolate deformation of the gasket due to interaction of the gasket with the first cup from deformation of the gasket due to interaction of the gasket with another one of the one or more cups.

18. A container according to claim 1 wherein the lid is bowed across its transverse width to improve a seal between the lid and the first cup.

19. A container according to claim 1 wherein at least two cups of the one or more cups have different heights such that respective bases of the at least two cups are spaced apart from the base of the main container by different distances.

20. A container according to claim 1 wherein contact of the first cup with the lower portion of the first sidewall prevents sagging of the first cup under the weight of contents of the first cup to thereby improve a seal between the first cup and the lid.

* * * * *